(12) United States Patent
Marupaduga

(10) Patent No.: US 11,197,240 B1
(45) Date of Patent: Dec. 7, 2021

(54) WIRELESS ACCESS NODE USAGE BASED ON MOBILE ACTIVE USERS

(71) Applicant: T-MOBILE INNOVATIONS LLC, Overland Park, KS (US)

(72) Inventor: Sreekar Marupaduga, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/907,950

(22) Filed: Jun. 22, 2020

(51) Int. Cl.
*H04W 24/10* (2009.01)
*H04W 48/20* (2009.01)
*H04W 48/16* (2009.01)

(52) U.S. Cl.
CPC ........... *H04W 48/20* (2013.01); *H04W 24/10* (2013.01); *H04W 48/16* (2013.01)

(58) Field of Classification Search
CPC ......................... H04W 48/20; H04W 52/0225
See application file for complete search history.

(56) References Cited

U.S. PATENT DOCUMENTS

| | | | |
|---|---|---|---|
| 8,358,982 B2 | 1/2013 | Van Der Velde et al. | |
| 8,634,836 B2 | 1/2014 | Pani et al. | |
| 8,873,413 B2 | 10/2014 | Jang et al. | |
| 8,897,783 B2 | 11/2014 | Olofsson et al. | |
| 9,088,912 B2 | 7/2015 | Ou | |
| 9,313,694 B2 | 4/2016 | Lee et al. | |
| 9,344,945 B2 | 5/2016 | Da Silva et al. | |
| 9,408,121 B2 | 8/2016 | Xiao et al. | |
| 9,497,685 B2 | 11/2016 | Lee et al. | |
| 9,894,569 B2 | 2/2018 | Lee et al. | |
| 10,194,361 B2 | 1/2019 | Sirotkin et al. | |
| 10,485,000 B2* | 11/2019 | Shaheen | H04W 36/0022 |
| 2013/0021962 A1* | 1/2013 | Hu | H04W 48/20 370/315 |
| 2013/0223410 A1* | 8/2013 | Karlsson | H04L 5/0091 370/332 |
| 2020/0413457 A1* | 12/2020 | Hong | H04W 76/10 |

* cited by examiner

*Primary Examiner* — Qutbuddin Ghulamali

(57) ABSTRACT

A wireless communication network serves a wireless User Equipment (UE) and comprises a wireless access node and a support access node. The wireless access node determines an amount of mobile active UEs for the support access node. The wireless access node determines an add threshold for the support access node based on amount of mobile active UEs for the support access node. The wireless access node determines an add value for the support access node and determines when the add value is greater than the add threshold. When the add value is greater than the add threshold, the wireless access node signals the support access node to serve the wireless UE and signals the wireless UE to attach to the support access node. In response, the support access node wirelessly transfers user data for a wireless communication service to the wireless UE.

18 Claims, 11 Drawing Sheets

WIRELESS ACCESS NODE USAGE BASED ON MOBILE ACTIVE USERS

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), and Low-Power Wide Area Network (LP-WAN). In some examples, both LTE and 5GNR networks serve the same wireless user device at the same time with an integrated data service called dual-connectivity.

A wireless access node that provides dual connectivity simultaneously serves a single user device over parallel LTE and 5GNR wireless links. An Evolved Universal Terrestrial Radio Access Network Dual Connectivity (EN-DC) node comprises both an LTE eNodeB and one or more 5GNR gNodeBs. An EN-DC user device initially attaches to the LTE eNodeB in the EN-DC node. The EN-DC user device reports 5GNR signal quality for the 5GNR gNodeBs to the LTE eNodeB. The LTE eNodeB determines if any of the 5GNR gNodeBs should be used to serve the EN-DC user device based on the signal quality. To determine if a 5GNR gNodeB should be used, the LTE eNodeB compares the received signal quality for the 5GNR gNodeB at the EN-DC user device to a threshold that is referred to as "B1". The LTE eNodeB may also consider frequency offsets and hysteresis along with signal quality.

Wireless user devices that exchange user data with a wireless access node have an active connection to the wireless access node. Conversely, wireless user devices that are not exchanging data with the wireless access node may have an idle connection to the wireless access node. The different types of connections that wireless user devices have with the wireless access node are associated with different amounts of radio resources. Wireless access nodes use radio resources to exchange wireless signals with wireless user devices. Unfortunately, wireless access nodes have limited amounts of radio resources. Wireless user devices that are mobile and have an active connection with the wireless access node use a relatively large amount of radio resources. If a wireless access node serves a relatively large amount of mobile active wireless user devices, the ability of the wireless access node to exchange wireless signals with wireless user devices is reduced. A wireless user device with an active connection is referred to as "Radio Resource Control (RRC) connected".

Unfortunately, the wireless access nodes do not effectively and efficiently mitigate disruptions in wireless communications caused by large amounts of mobile active wireless user devices. Moreover, the EN-DC access nodes do not effectively and efficiently mitigate disruptions in wireless communications caused by large amounts of mobile active wireless user devices.

TECHNICAL OVERVIEW

A wireless communication network serves wireless User Equipment (UE) with a wireless communication service over multiple wireless communications links. The wireless communication network comprises a wireless access node and a support access node. The wireless access node wirelessly receives a signal metric for the support access node from a wireless UE. The wireless access node determines an amount of mobile active wireless UEs for the support access node. The wireless access node determines an add threshold for the support access node based on the amount of mobile active users for the support access node. The wireless access node converts the signal metric into an add value for the support access node and determines when the add value is greater than the add threshold. When the add value is greater than the add threshold, the wireless access node signals the support access node to serve the wireless UE and signals the wireless UE to attach to the support access node. The support access node wirelessly transfers user data for the wireless communication service to the wireless UE in response to the signal from the wireless access node.

DETAILED DESCRIPTION

Figure 1:
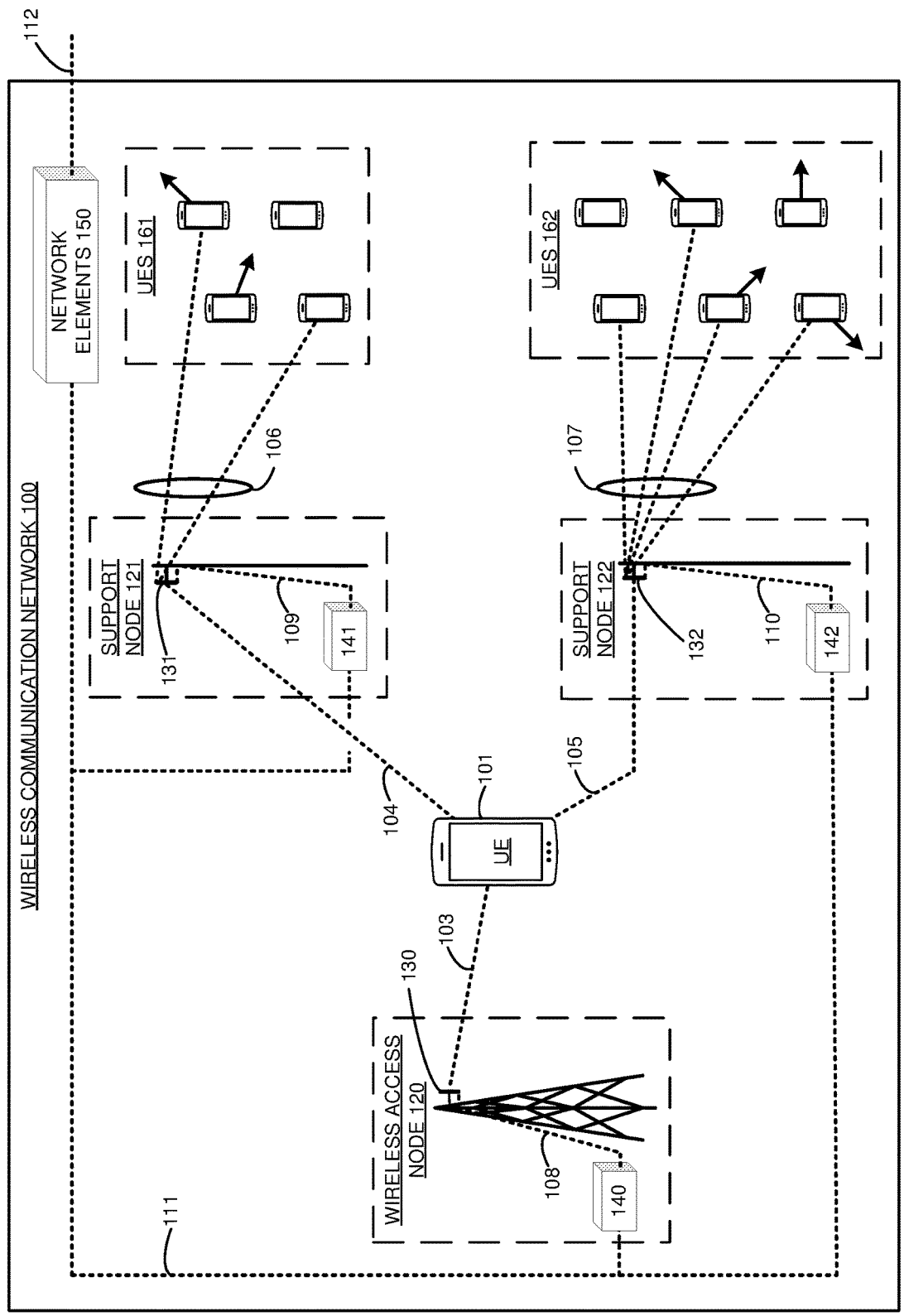
FIG. 1 illustrates a wireless communications network to serve a wireless User Equipment with a wireless communication service over multiple wireless links based on the amount of mobile active wireless User Equipment (UE).

FIG. 1 illustrates wireless communication network 100 to serve wireless User Equipment (UE) 101 with a wireless communication service over multiple wireless links based on an amount of mobile active UEs. Wireless communication network 100 comprises wireless UE 101, wireless access node 120, support access nodes 121-122, network elements 150, and wireless UEs 161-162. Although UE 101 and UEs 161-162 are depicted as smartphones, UE 101 and UEs 161-162 might instead comprise computers, robots, vehicles, or other data appliances with wireless communication circuitry. Wireless access node 120 comprises radio 130 and Baseband Unit (BBU) 140. Support access nodes 121-122 comprise radios 131-132 and BBUs 141-142. Radios 130-132 are mounted on a tower, but radios 130-132 may use other mounting structures or no mounting structure at all.

Support access node 121 serves UEs 161 over wireless links 106. Support access node 122 serves UEs 162 over wireless links 107. A portion of UEs 161 and 162 comprise mobile active UEs. Another portion of UEs 161 and 162 comprise UEs that are not mobile active UEs. A mobile active UE is a UE that is physically moving above a speed threshold with an active connection to an access node.

Various examples of network operation and configuration are described herein. In one example, UE 101 wirelessly attaches to radio 130. Radio 130 wirelessly exchanges user data with UE 101 over wireless links 103. Radio 130 exchanges the user data with BBU 140 over BBU links 108. BBU 140 exchanges the user data with network elements 150 over backhaul links 111. Network elements 150 exchange the user data with external systems over external links 112. UE 101 measures one or more signal metrics for support access nodes 121 and 122. Exemplary signal metrics comprise Received Signal Code Power (RSCP), Energy per Chip over Noise Spectral Density (Ec/No), Receiver Level (RxLev), or some other radio measurement. UE 101 exchanges the one or more signal metrics with radio 130 over wireless link 103. Radio 130 exchanges the one or more signal metrics with BBU 140 over BBU links 108. BBU 140 determines amounts of mobile active UEs in UEs 161 and 162 for each of support access nodes 121 and 122—typically by receiving a measurement report that indicates the amount of mobile active UEs for support access nodes 121 and 122.

BBU 140 determines an add threshold for each of support access nodes 121 and 122 based on the amount of mobile active UEs for each of support access nodes 121 and 122. BBU 140 selects a relatively high add threshold for an access node when its amount of mobile active UEs is relatively high. BBU 140 selects a relatively low add threshold for an access node when its amount of mobile active UEs is relatively low. BBU 140 converts the signal metrics for support access nodes 121 and 122 into add values for support access nodes 121 and 122. When the add value is greater than the add threshold for either of support access nodes 121 and 122, BBU 140 directs the corresponding ones of support access nodes 121 and 122 to wirelessly exchange user data with UE 101. BBU 140 directs UE 101 to wirelessly attach to the corresponding ones of support access nodes 121 and 122.

Wireless links 103-107 use over-the-air air electromagnetic frequencies in the low-band, mid-band, high-band, or some other portion of the electromagnetic spectrum. Wireless links 103-107 use protocols like Fifth Generation New Radio (5GNR), Long Term Evolution (LTE), Institute of Electrical and Electronic Engineers (IEEE) 802.11 (WIFI), Low-Power Wide Area Network (LP-WAN), and/or some other format wireless protocol. Links 108-112 use metal, glass, air, or some other media. Links 108-112 use IEEE 802.3 (Ethernet), Time Division Multiplex (TDM), Data Over Cable System Interface Specification (DOCSIS), Internet Protocol (IP), Hypertext Transfer Protocol (HTTP), Fifth Generation Core (5GC), 5GNR, LTE, WIFI, virtual switching, inter-processor communication, bus interfaces, and/or some other data communication protocols. Links 103-112 may comprise intermediate network elements like relays, routers, and controllers.

UE 101 and radios 130-132 comprise antennas, amplifiers, filters, modulation, analog/digital interfaces, microprocessors, software, memories, transceivers, bus circuitry, and the like. BBUs 140-142 and network elements 150 comprise microprocessors, memories, software, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein.

Wireless nodes 120-122 comprise 5GNR gNodeBs, Fifth Generation Radio Access Technology (5G RAT) types, LTE eNodeBs, WIFI hotspots, LP-WAN hubs, Evolved Universal Terrestrial Radio Access Network Dual Connectivity (EN-DC) nodes, and/or some other wireless network apparatus. Network elements 150 comprise User Plane Functions (UPFs), Access and Mobility Management Function (AMFs), Serving Gateways (SGWs), Mobility Management Entities (MMEs), and/or some other network apparatus.

In some examples, UE 110 selects report thresholds based the amount of mobile active UEs for supports access nodes 121 and 122 as described herein for the selection of the add thresholds. UE 110 measures signal metrics indicating the amount of mobile active UEs for support nodes 121 and 122 and compares the signal metrics to the report thresholds. When the signal metrics for one or more support nodes 121 and 122 exceed their report thresholds, UE 110 transfers a measurement report to wireless access node 120 indicating the signal metrics for support nodes 121 and 122.

Figure 2:
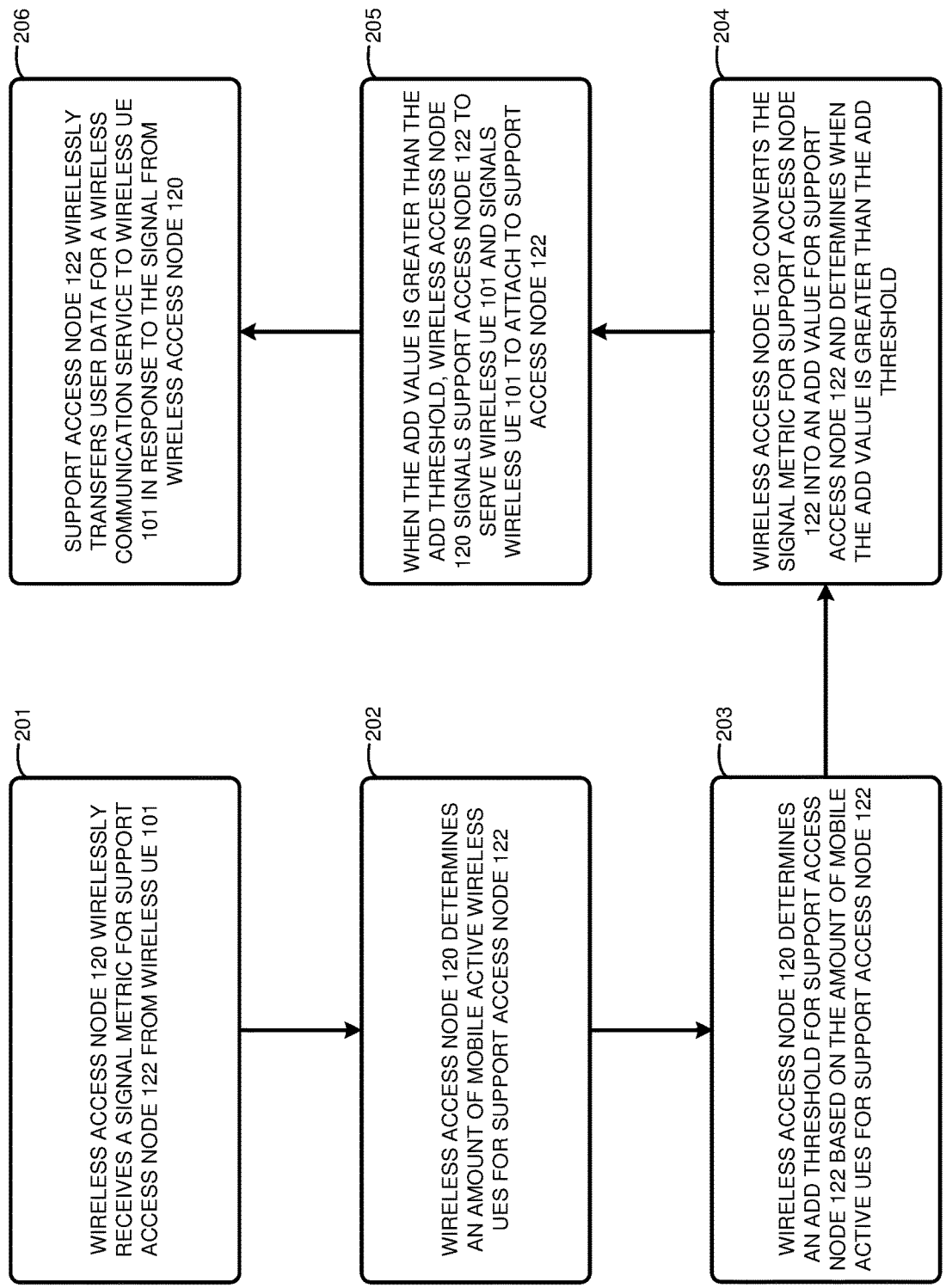
FIG. 2 illustrates an exemplary operation of the wireless communication network to serve the wireless UE over multiple wireless links based on the amount of mobile active wireless UEs.

FIG. 2 illustrates an exemplary operation of wireless communication network 100 to serve wireless UE 101 with a wireless communication service over multiple wireless links based on the amount of mobile active UEs. Wireless access node 120 wirelessly receives a signal metric for support access node 122 from wireless UE 101 (201). Wireless access node 120 determines an amount of mobile active wireless UEs for support access node 122 (202). Wireless access node 120 determines an add threshold for support access node 122 based on the amount of mobile active wireless UEs for support access node 122 (203). For example, wireless access node 120 may select a relatively high add threshold when the amount of mobile active wireless UEs for support access node 122 is relatively high. Conversely, wireless access node 120 may select a relatively low add threshold when the amount of mobile active wireless UEs for support access node 122 is relatively low.

Wireless access node 120 converts the signal metric for support access node 122 into an add value for support access node 122 and determines when the add value is greater than the add threshold (204). When the add value is greater than the add threshold, wireless access node 120 signals support access node 122 to serve wireless UE 101 and signals wireless UE 101 to wirelessly attach to support access node 122 (205). Support access node 122 wirelessly transfers user data for the wireless communication service to wireless UE 101 in response to the signal from wireless access node 120 (206).

Figure 3:
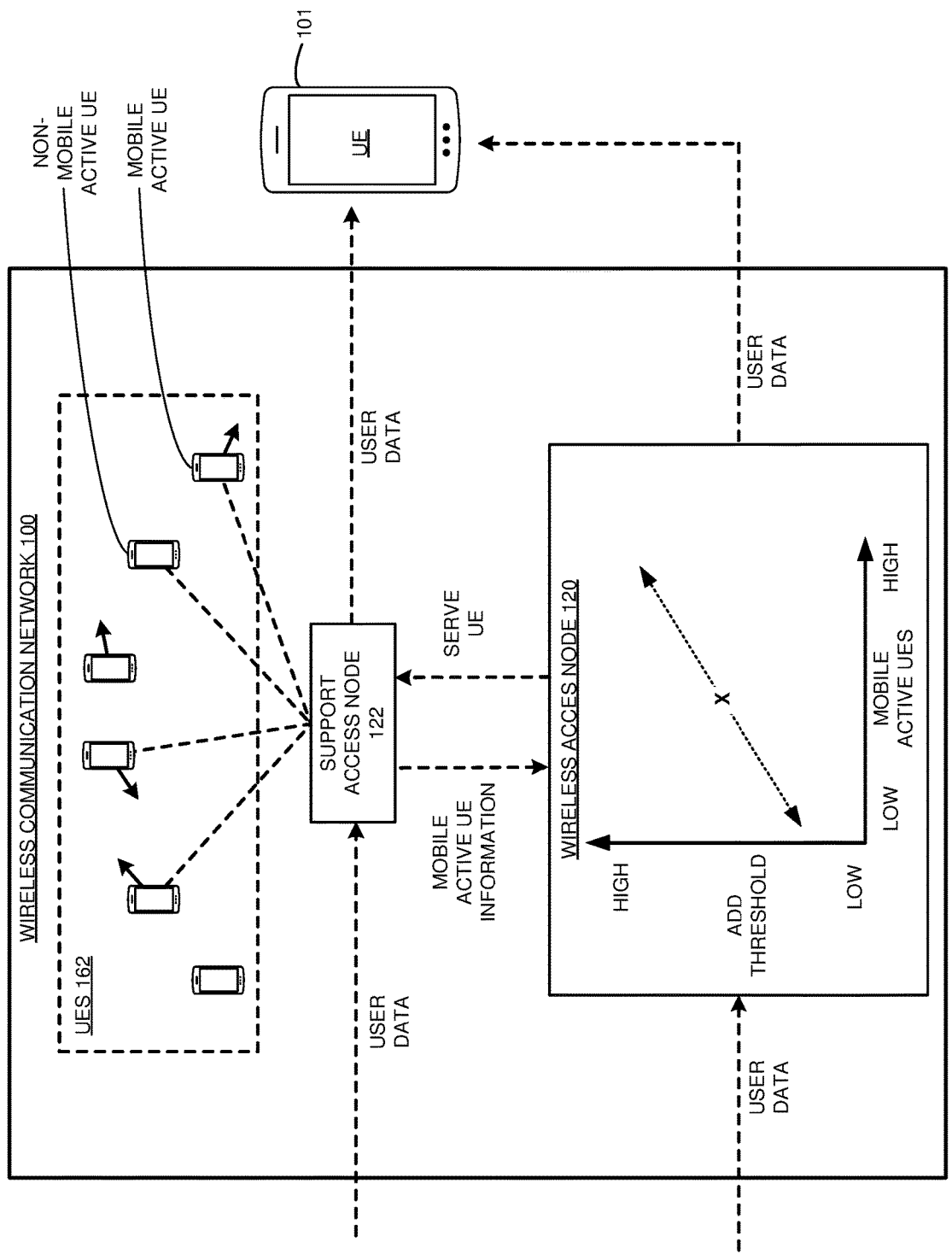
FIG. 3 illustrates an exemplary operation of the wireless communication network to serve the wireless UE over multiple wireless links based the amount of mobile active wireless UEs.

FIG. 3 illustrates an exemplary operation of wireless communication network 100 to serve wireless UE 101 with a wireless communication service over multiple wireless links based on an amount of mobile active UEs. Support access node 122 serves wireless UEs 162. A portion of wireless UEs 162 comprise mobile active UEs as shown in FIG. 3. Another portion of wireless UEs 162 comprise non-mobile active UEs as shown in FIG. 3. The amount of mobile active UEs is the number of mobile active UEs of UEs 162 served by support access node 122. Support access node 122 may send mobile active UE information to wireless access node 120 that indicates the amount of mobile active UEs.

Wireless access node 120 hosts a data structure that implements the graph shown on FIG. 3. The vertical axis of the graph indicates an add threshold in an exemplary range: Low to High. The horizontal axis indicates an amount of mobile active UEs in an exemplary range: Low to High. These terms are illustrative and numerical values could be used. As indicated by the X mark on the graph, an amount of mobile active UEs correlates to an add threshold value. Wireless access node 120 determines the number of mobile active UEs for support access node 122. Wireless access node 120 may determine the number of mobile active UEs for support access node 122 based on the mobile active UE information. Wireless access node 120 may use triangulation, determine changes in UE location, determine UE velocity, or other techniques to determine the amount of mobile active UEs for support access node 122. Wireless access node 120 determines the add threshold for support access node 122 based on the amount of mobile active UEs served by support access node 122 and the data structure.

UE 101 attaches to wireless access node 120. UE 101 wirelessly transfers signal metrics for support access node 122 to wireless access node 120. The signal metrics indicate a signal strength and/or signal quality. For example, the signal metrics may include RSCP, Ec/No, RxLev, or some other radio measurement. Wireless access node 120 receives the signal metrics from UE 101. Wireless access node 120 converts the signal metrics for support access node 122 into an add value for support access node 122. When the add value is less than the add threshold, wireless access node 120 does not add support access node 122. When the add value is greater than the add threshold, wireless access node 120 directs support access node 122 to serve UE 101 with a wireless communications service and signals UE 101 to attach to support access node 122. Support access node 122 wirelessly transfers user data for the wireless communications service to UE 101.

Advantageously, wireless access node 120 controls the add threshold to mitigate service disruptions caused by large amounts of mobile active UEs.

Figure 4:
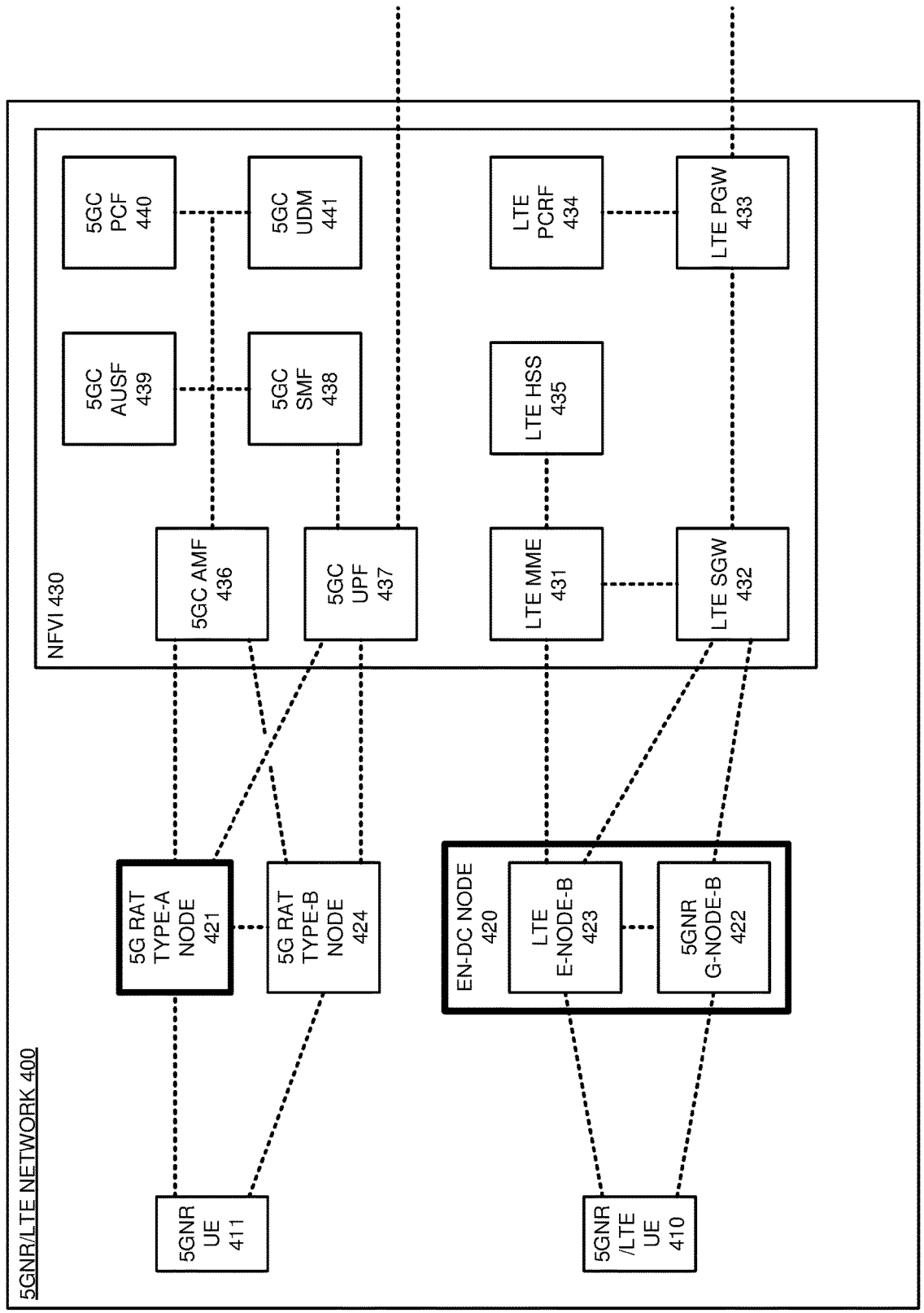
FIG. 4 illustrates a Fifth Generation New Radio (5GNR) Long Term Evolution (LTE) network to serve UEs over 5GNR gNodeB and 5G Radio Access Technology (RAT) based on an amount of mobile RRC connected wireless UEs.

FIG. 4 illustrates Fifth Generation New Radio (5GNR) Long Term Evolution (LTE) network 400 to serve UEs 410-411 over 5GNR gNodeB and Fifth Generation Radio Access Technology (5G RAT) types based an amount of mobile Radio Resource Control (RRC) Connected UEs. A mobile RRC connected UE is an example of a mobile active UE. 5GNR/LTE network 400 is an example of wireless communication network 100, although network 100 may differ. 5GNR/LTE network 400 comprises 5GNR/LTE 410, 5GNR UE 411, EN-DC node 420, 5G RAT type-A node 421, 5G RAT type-B node 424, and Network Function Virtualization Infrastructure (NFVI) 430. EN-DC node 420 comprises 5GNR gNodeB 422 and LTE eNodeB 423. NFVI 430 comprises LTE Mobility Management Entity (MME) 431, LTE Serving Gateway (SGW) 432, LTE Packet Data Network Gateway (PGW) 433, LTE Policy Charging Rules Function (PCRF) 434, LTE Home Subscriber System (HSS) 435, Fifth Generation Core (5GC) Access and Mobility Management Function (AMF) 436, 5GC User Plane Function (UPF) 437, 5GC Session Management Function (SMF) 438, 5GC Authentication and Security Function (AUSF) 439, Policy Control Function (PCF 440), and 5GC Unified Data Manager (UDM) 441.

UE 410 attaches to LTE eNodeB 423 in EN-DC node 420 and UE 410 indicates its 5GNR capability. LTE eNodeB 423 requests data service for UE 410 from LTE MME 431 over S1-MME signaling and indicates the 5GNR capability of UE 410. LTE MME 431 interacts with HSS 435 to authenticate and authorize LTE/5GNR UE 410 for wireless data services that are represented by Access Point Names (APNs). LTE MME 431 generates 5GNR instructions for 5GNR/LTE UE 410 in response to the 5GNR UE capability and the UE authorization. LTE MME 431 transfers the APNs for UE 410 to LTE PGW 433 over LTE SGW 432. LTE PGW 433 interacts with LTE PCRF 434 to select Quality-of-Service Class Identifiers (QCIs) and network addresses for UE 410 based on the APNs. LTE PGW 433 transfers the APNs, QCIs, and network addresses for UE 410 to LTE MME 431 over LTE SGW 432. MME 431 transfers the APNs, QCIs, network address, and the 5GNR instructions for UE 410 to LTE eNodeB 423. LTE eNodeB 423 transfers the selected APNs, QCIs, network addresses, and 5GNR instructions to UE 410. LTE PGW 433 exchanges user data for UE 410 with external systems. LTE PGW 433 exchanges the user data with SGW 432 which exchanges the user data with LTE eNodeB 423. LTE eNodeB 423 exchanges the user data with UE 410.

In response to the 5GNR instructions, UE 410 measures the signal strength of the 5GNR pilot signal from 5GNR gNodeB 422 and transfers the 5GNR signal strength measurement to LTE eNodeB 423. LTE eNodeB 423 determines frequency offset, hysteresis, and the amount of mobile RRC connected UEs for 5GNR gNodeB 422. For example, LTE eNodeB 423 may receive a measurement report indicating the amount of mobile RRC connected UEs served by 5GNR gNodeB 422. LTE eNodeB 423 may store a data structure indicating add/drop thresholds for amounts of mobile RRC connected UEs for multiple 5GNR gNodeBs. LTE eNodeB 423 determines the B1 addition threshold for 5GNR gNodeB 422 based on the amount of mobile RRC connected UEs for 5GNR gNodeB 422. Typically, LTE eNodeB 423 selects a relatively high B1 addition threshold when the amount of mobile RRC connected UEs for 5GNR gNodeB 422 is relatively high. Likewise, LTE eNodeB 423 selects a relatively low B1 addition threshold when the amount of mobile RRC connected UEs for 5GNR gNodeB 422 is relatively low. Alternatively, the LTE eNodeB 423 may determine the B1 add threshold for 5GNR gNodeB 422 based on the amount of mobile RRC connected UEs served by LTE eNodeB 423.

LTE eNodeB 423 determines an inter Radio Access Technology (RAT) addition value for 5GNR gNodeB 422. The inter-RAT addition value comprises a sum of the 5GNR signal strength, the frequency offset, and the hysteresis. LTE eNodeB 423 determines when the inter-RAT addition value for 5GNR gNodeB 422 is greater than the B1 addition threshold for 5GNR gNodeB 422. When the inter-RAT addition value is greater than the B1 addition threshold, LTE eNodeB 423 directs 5GNR gNodeB 422 to serve UE 410 and directs UE 410 to attach to 5GNR gNodeB 422. LTE eNodeB 423 notifies LTE MME 431 and LTE MME 431 directs LTE SGW 432 to serve UE 410 over 5GNR gNodeB 422. In response, LTE SGW 432 exchanges user data for UE 410 with 5GNR gNodeB 422. 5GNR gNodeB 422 exchanges the user data with UE 410.

LTE eNodeB 423 determines a B1 drop threshold for 5GNR gNodeB 422 based on the amount of mobile RRC connected UEs for 5GNR gNodeB 422. The B1 drop threshold may be a different value than the B1 addition threshold. LTE eNodeB 423 receives subsequent 5GNR signal strength measurements for 5GNR gNodeB 422 from UE 410. LTE eNodeB 423 determines an inter-RAT drop value for 5GNR gNodeB 422 based on the sum of the subsequent 5GNR signal strength, the frequency offset, and the hysteresis. When the inter-RAT drop value is lower than the B1 drop threshold, LTE eNodeB 423 signals 5GNR gNodeB 422 to stop serving UE 410 and signals UE 410 to detach from 5GNR gNodeB 422. LTE MME 431 directs LTE SGW 432 to stop serving UE 410 over 5GNR gNodeB 422. In response, LTE SGW 432 stops exchanging user data for UE 410 with 5GNR gNodeB 422. 5GNR gNodeB 422 stops exchanging the user data with UE 410.

Note that 5G RAT type-A node 421 and 5G RAT type-B node 424 use different types of 5G RAT. The different types of 5G RAT may have different resource block time intervals and resource block bandwidths. For example, 5G RAT type-B node 424 may provide an enhanced video broadcast service with unique time intervals and bandwidths. Some 5G UEs are not capable of using both types of 5G RATs, but 5GNR UE 411 is capable of using both types of 5G RAT. 5GNR UE 411 attaches to 5G RAT type-A node 421 and indicates its 5G RAT capability for multiple 5G RAT types.

5G RAT type-A node 421 requests data service for UE 411 from 5GC AMF 436 over N2 signaling the indicates the 5G RAT type capability for UE 411. 5GC AMF 436 interacts with 5GC SMF 438, 5GC AUSF 439, 5GC UDM 441, and 5GC PCF 440 to authenticate and authorize 5GNR UE 411 for 5G RAT data services. 5GC AMF 436 generates 5G RAT instructions responsive to the 5G RAT UE capability and the 5G RAT authorization. 5GC AMF 436 transfers quality-of-service metrics, network addressing, and 5G RAT instructions for UE 411 to 5G RAT type-A node 421 and 5GC SMF 438. 5GC SMF 438 directs 5GC UPF 437 to serve UE 411 per the quality-of-service metrics and network addressing over 5G RAT type-A node 421. 5G RAT type-A node 421 transfers the quality-of-service metrics, network addressing, and 5G RAT instructions to UE 411.

In response to the 5G RAT instructions, UE 411 measures 5G RAT signal strength for 5G RAT type-B node 424 and wirelessly transfers the 5G RAT signal strength for 5G RAT type-B node 424 to 5G RAT type-A node 421. 5G RAT type-A node 421 determines the amount of mobile RRC connected UEs, frequency offset, and hysteresis for 5G RAT type-B node 424. 5G RAT type-A node 421 may receive a measurement report indicating the amount of mobile RRC connected UEs for 5G RAT type-B node 424. 5G RAT type-A node 421 determines an inter-RAT addition threshold for 5G RAT type-B node 424 based on the amount of mobile RRC connected UEs for 5G RAT type-B node 424. 5G RAT type-A node 421 determines an inter-RAT addition value for 5G RAT type-B node 424 based on the 5G RAT signal strength, the frequency offset, and the hysteresis.

5G RAT type-A node 421 determines when the inter-RAT addition value for 5G RAT type-B node 424 is greater than the inter-RAT addition threshold for 5G RAT type-B node 424. When the inter-RAT addition value is greater than the inter-RAT addition threshold, 5G RAT type-A node 421 directs 5G RAT type-B node 424 to serve UE 411 and directs UE 411 to attach to 5G RAT type-B node 424. 5G RAT type-A node 421 notifies 5GC AMF 436 of the attachment, and 5GC AMF 436 directs 5GC SMF 438 to direct 5GC UPF 437 to serve UE 411 per the quality-of-service metrics and network addressing over 5G RAT type-B node 424. 5GNR UE 411 attaches to 5G RAT type-B node 424 and 5G RAT type-B node 424 exchanges user data with UE 411.

5G RAT type-A node 421 determines an inter-RAT drop threshold for 5G RAT type-B node 424 based on the amount of mobile RRC connected UEs for 5G RAT type-B node 424. 5G RAT type-A node 421 receives subsequent 5G RAT signal strength measurements from UE 411. 5G RAT type-A node 421 determines an inter-RAT drop value for 5G RAT type-B node 424 based on the subsequent 5G RAT signal strength, the frequency offset, and the hysteresis. When the drop value is lower than the drop threshold, 5G RAT type-A node 421 signals UE 411 to detach from 5G RAT type-B node 424 and 5G RAT type-B node 424 stops exchanging the user data with UE 411.

Advantageously, LTE eNodeB 423 effectively and efficiently manipulates B1 add/drop thresholds based on the amount of mobile RRC connected UEs to load balance the amount of UEs served by 5GNR access nodes thereby mitigating service disruptions caused by relatively large amounts of mobile RRC connected UEs. Likewise, 5G RAT type-A node 421 effectively and efficiently manipulates the inter-RAT add/drop thresholds based in the amount of mobile RRC connected UEs to load balance the amount of UEs served by 5G RAT types service disruptions caused by relatively large amounts of mobile RRC connected UEs.

In some examples, UEs 410-411 select B1 add/drop thresholds based on amounts of mobile RRC connected UEs. UEs 410-411 apply mobile RRC connected UE metrics from 5GNR gNodeB 422 and 5G RAT type-B node 424 to the B1 thresholds to trigger 5GNR measurement reports to LTE eNodeB 423 and 5G RAT type-A node 421 that indicate the mobile RRC connected UE metrics.

Figure 5:
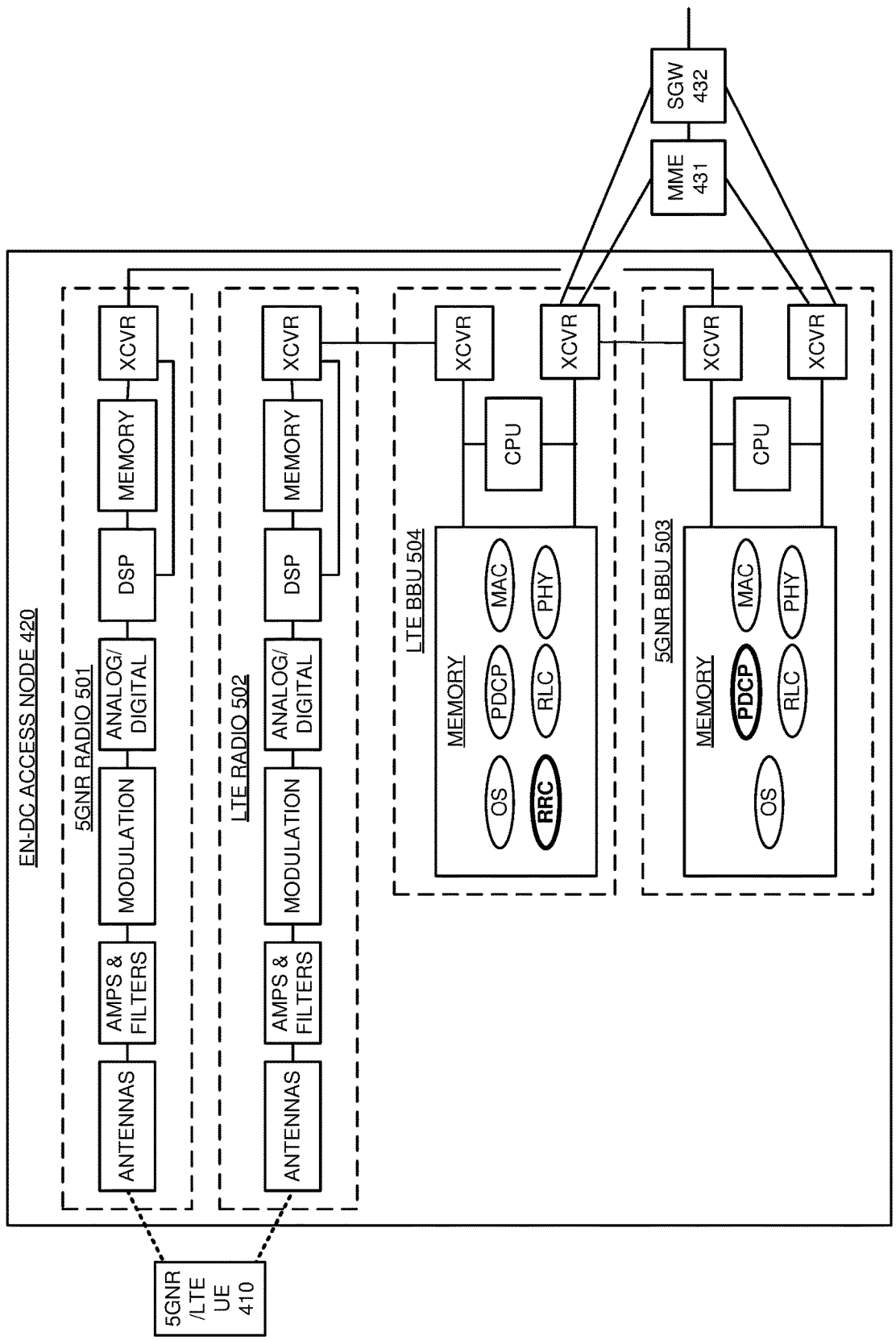
FIG. 5 illustrates an Evolved Universal Terrestrial Radio Access Network Dual Connectivity (EN-DC) access node to serve UEs over 5GNR gNodeB based on the amount of mobile RRC connected wireless UEs.

FIG. 5 illustrates EN-DC access node 420 to serve UE 410 over 5GNR based on the amount of mobile RRC connected UEs. EN-DC access node 420 is an example of wireless access node 120, although wireless access node 120 may differ. EN-DC access node 420 comprises 5GNR radio 501, LTE radio 502, 5GNR Baseband Unit (BBU) 503, and LTE BBU 504. Radios 501-502 comprise antennas, amplifiers, filters, modulation, analog-to-digital interfaces, DSP, memory, and transceivers (XCVR) that are coupled over bus circuitry. BBUs 503-504 comprise memory, CPU, and transceivers that are coupled over bus circuitry. The memories in BBUs 503-504 store operating systems (OS) and network applications like Physical Layer (PHY), Media Access Control (MAC), Radio Link Control (RLC), Packet Data Convergence Protocol (PDCP), and Radio Resource Control (RRC). The CPU in BBUs 503-504 execute the operating systems, PHYs, MACs, RLCs, PDCPs, and RRCs to exchange network signaling with UE 410 and MME 431 and to exchange user data between UE 410 and SGW 432.

RRC functions comprise authentication, security, handover control, status reporting, Quality-of-Service (QoS), network broadcasts and pages, and network selection. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

UE 410 is wirelessly coupled to the antennas in 5GNR radio 501 over a 5GNR link. The transceiver in 5GNR radio 501 is coupled to a transceiver in 5GNR BBU 503 over Common Public Radio Interface (CPRI) links. A transceiver in 5GNR BBU 503 is coupled to MME 431 and SGW 432 over backhaul links. UE 410 is wirelessly coupled to the antennas in LTE radio 502 over an LTE link. The transceiver in LTE radio 502 is coupled to a transceiver in LTE BBU 504 over CPRI links. A transceiver in LTE BBU 504 is coupled to MME 431 and to SGW 432 over backhaul links. A transceiver in 5GNR BBU 503 is coupled to a transceiver in LTE BBU 504 over X2 links.

UE 410 wirelessly attaches to LTE antennas in LTE radio 502. The LTE antennas in LTE radio 502 receive wireless LTE signals from UE 410 that transport Uplink (UL) LTE signaling, UL LTE data, and indicate 5GNR capability for UE 410. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL LTE symbols from the UL digital signals. The CPUs execute the network applications to process the UL LTE symbols and recover the UL LTE signaling and the UL LTE data. The RRC processes the UL LTE signaling and Downlink (DL) S1-MME signaling to generate new UL S1-MME signaling and new DL LTE signaling. The RRC transfers the new UL S1-MME signaling, including the 5GNR capability of UE 410, to MME 431 over the backhaul links. MME 431 authenticates and authorizes 5GNR service for UE 410, and in response to the authorization, MME 431 generates 5GNR instructions for UE 410. The PDCP transfers the UL LTE data to LTE SGW 432 over the backhaul links.

In LTE BBU 504, the LTE RRC receives the DL S1-MME signaling and the 5GNR instructions from MME 431. The PDCP receives DL LTE data from SGW 432. The LTE network applications process the new DL LTE signaling and the DL LTE data to generate corresponding DL LTE symbols that carry the DL LTE signaling and DL LTE data. In LTE radio 502, the DSP processes the DL LTE symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals that transport the DL LTE signaling, DL LTE data, and 5GNR instructions to UE 410.

In response to the 5GNR instructions, UE 410 measures 5GNR signal strength for 5GNR gNodeBs. UE 410 wirelessly transfers the 5GNR signal strength to LTE radio 502. LTE radio 502 exchanges the 5GNR signal strength with LTE BBU 504 over the CPRI links. The LTE RRC in LTE BBU 504 determines the amount of mobile RRC connected UEs, the frequency offset, and the hysteresis for 5GNR BBU 503. The LTE RRC in LTE BBU 504 may direct the 5GNR PHYs in 5GNR BBU 503 to measure the 5GNR signal angle of arrival or the 5GNR signal time of arrival for UEs to determine the amount of mobile RRC connected UEs for 5GNR BBU 503. For a given UE, if the LTE RRC determines the 5GNR signal time of arrival or angle or arrival are changing, the LTE RRC may determine the UE is moving above a speed threshold. In other examples, the LTE RRC may use triangulation to determine if a UE is moving at a speed above a speed threshold. The LTE RRC may track changes in a UE's location and the UE's velocity to determine if the UE is moving at a speed above a speed threshold. In further examples, a UE may report directly to the LTE RRC indicating that the UE is moving above a speed threshold. If the given UE is also RRC connected, the LTE RRC may classify the UE as a mobile RRC connected UE.

The LTE RRC in BBU 504 determines a B1 add threshold for 5GNR BBU 503 based on the amount of mobile RRC connected UEs for 5GNR BBU 503. The LTE RRC in BBU 504 determines an inter-RAT add value for 5GNR BBU 503 based on the sum of the 5GNR signal strength, the frequency, and the hysteresis for 5GNR BBU 503. The LTE RRC in BBU 504 determines when the inter-RAT add value is greater than the B1 add threshold. When the inter-RAT add value exceeds the B1 add threshold, the LTE RRC in BBU 504 directs the 5GNR PDCP in BBU 503 to serve UE 410. The LTE RRC in BBU 504 also directs UE 410 to attach to the 5GNR PDCP in 5GNR BBU 503. UE 410 attaches to the 5GNR PDCP in BBU 503 over 5GNR radio 501. The LTE RRC in BBU 504 notifies MME 431 of the 5GNR attachment. MME 431 directs SGW 432 to serve UE 410 over 5GNR BBU 503. SGW 432 exchanges 5GNR data with the 5GNR PDCP in 5GNR BBU 503. The 5GNR PDCP in BBU 503 exchanges the 5GNR data with the 5GNR PDCP in UE 410 over the RLCs, MACs, and PHYs.

In 5GNR radio 501, the antennas receive wireless 5GNR signals from UE 410 that transport Uplink (UL) 5GNR signaling and UL 5GNR data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL 5GNR symbols from the UL digital signals. The CPUs execute the network applications to process the UL 5GNR symbols and recover the UL 5GNR signaling and the UL 5GNR data. The 5GNR PDCP processes the UL 5GNR signaling and DL X2 signaling from the LTE RRC in LTE BBU 504 to generate new UL X2 signaling and new DL 5GNR signaling. The 5GNR PDCP transfers the new UL X2 signaling to the LTE RRC in BBU 504. The 5GNR PDCP transfers the UL 5GNR data to SGW 432 over backhaul links.

In 5GNR BBU 503, the 5GNR PDCP receives the DL X2 signaling from the LTE RRC in BBU 504. The 5GNR PDCP also receives DL 5GNR data from SGW 432. The 5GNR network applications process the new DL 5GNR signaling and the DL 5GNR data to generate corresponding DL 5GNR symbols that carry the DL 5GNR signaling and DL 5GNR data. In 5GNR radio 501, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL 5GNR signaling and DL 5GNR data to UE 410.

In this example, the LTE RRC in LTE BBU 504 also determines a B1 drop threshold for 5GNR BBU 503 based on the amount of mobile RRC connected UEs for 5GNR BBU 503. The LTE RRC in BBU 504 wirelessly receives a subsequent 5GNR signal strength measurement from UE 410. The LTE RRC in LTE BBU 504 determines an inter-RAT drop value for 5GNR BBU 503 based on the subsequent 5GNR signal strength, the frequency offset, and the hysteresis. The LTE RRC in LTE BBU 504 stops the service to UE 410 over 5GNR radio 501 when the inter-RAT drop value is less than the B1 drop threshold. When the inter-RAT drop value is less than the B1 drop threshold, the LTE RRC in LTE BBU 504 directs the 5GNR PDCP in BBU 503 to stop serving UE 410 and notifies MME 431. The LTE RRC in LTE BBU 504 directs UE 410 to detach from 5GNR PDCP in 5GNR BBU 503. UE 410 wirelessly detaches from 5GNR BBU 503. MME 431 directs SGW 432 to stop serving UE 410 over 5GNR BBU 503. SGW 432 stops exchanging 5GNR data with the 5GNR PDCP in 5GNR BBU 503. The 5GNR PDCP in BBU 503 stops exchanging the 5GNR data with the 5GNR PDCP in UE 410 over the RLCs, MACs, and PHYs.

Figure 6:
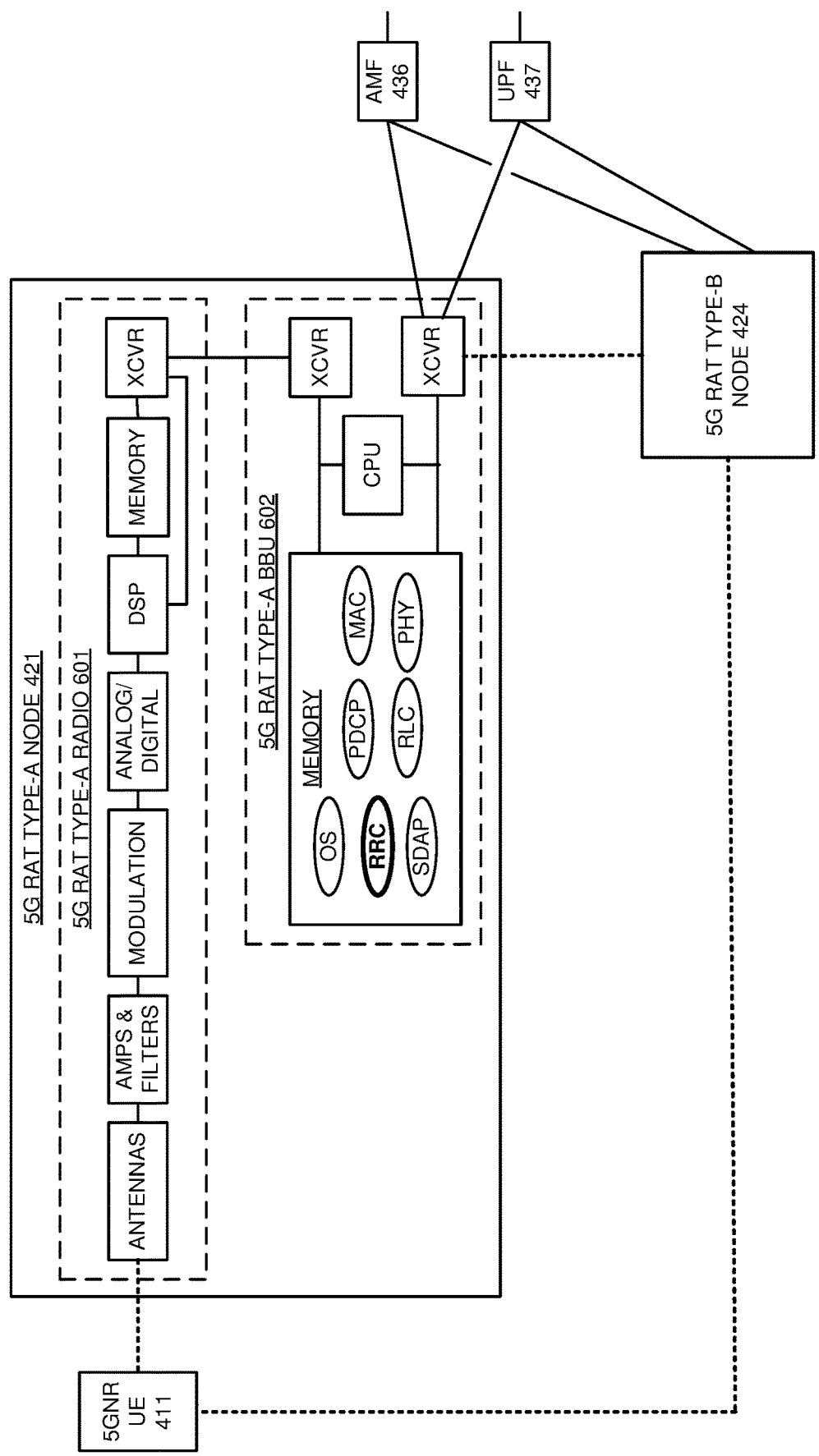
FIG. 6 illustrates a 5GNR RAT type to serve UEs based the amount of mobile RRC connected wireless UEs.

FIG. 6 illustrates 5G RAT type-A node 421 to serve 5GNR UE 411 over 5G RAT based on an amount of mobile RRC connected UEs. 5G RAT type-A node 421 is an example of wireless access node 120, although access node 120 may differ. 5G RAT type-A node 421 comprises 5G RAT type-A radio 601 and 5G RAT type-A BBU 602. 5G RAT type-A radio 601 comprises antennas, amplifiers, filters, modulation, analog-to-digital interfaces, DSP, memory, and transceivers that are coupled over bus circuitry. 5G RAT type-A BBU 602 comprises memory, CPU, and transceivers that are coupled over bus circuitry. The memory in BBU 602 stores operating systems and network applications like PHY, MAC, RLC, PDCP, RRC, and Service Data Adaptation Protocol (SDAP). The CPU in BBU 602 executes the operating systems, PHYs, MACs, RLCs, PDCPs, SDAPs, and RRCs to exchange network signaling with 5GNR UE 411 and AMF 436 and to exchange user data between 5GNR UE 411 and UPF 437.

RRC functions comprise authentication, security, handover control, status reporting, QoS, network broadcasts and pages, and network selection. SDAP functions comprise QoS marking and flow control. PDCP functions comprise LTE/5GNR allocations, security ciphering, header compression and decompression, sequence numbering and re-sequencing, and de-duplication. RLC functions comprise ARQ, sequence numbering and resequencing, and segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

5GNR UE 411 is wirelessly coupled to the antennas in 5G RAT type-A radio 601 over a 5G RAT link. The transceiver in 5G RAT type-A radio 601 is coupled to a transceiver in 5G RAT type-A BBU 602 over CPRI links. A transceiver in 5G RAT type-A BBU 602 is coupled to AMF 436 and UPF 437 over backhaul links. In 5G RAT type-A radio 601, the antennas receive wireless 5G signals from 5GNR UE 411 that transport UL 5G RAT signaling and UL 5G RAT data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL 5G RAT symbols from the UL digital signals. The CPUs execute the network applications to process the UL 5G RAT symbols and recover the UL 5G RAT signaling and the UL 5G RAT data. The 5G RAT RRC processes the UL 5G RAT signaling and DL N2 signaling from AMF 436 to generate new UL N2 signaling and new DL 5G RAT signaling. The 5G RAT RRC transfers the new UL N2 signaling to AMF 436. The 5G RAT SDAP transfers the UL 5G RAT data to UPF 437 over backhaul links.

In 5G RAT type-A BBU 602, the 5G RAT RRC receives the DL N2 signaling from AMF 436. The 5G RAT SDAP receives DL 5G RAT data from UPF 437. The 5G RAT network applications process the new DL 5G RAT signaling and the DL 5G RAT data to generate corresponding DL 5G RAT symbols that carry the DL 5G RAT signaling and DL 5G RAT data. In 5G RAT type-A radio 601, the DSP processes the DL 5G RAT symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5G RAT signals that transport the DL 5G RAT signaling and DL 5G RAT data to 5GNR UE 411.

In an example, 5GNR UE 411 attaches to 5G RAT RRC in BBU 602 in indicates is capability to handle various 5G RAT types. The 5G RAT RRC in BBU 602 requests data service for UE 411 from 5GC AMF 436 over N2 signaling and indicates its 5G RAT capabilities. 5GC AMF 436 interacts with 5GC SMF 438, 5GC AUSF 439, 5GC UDM 441, and 5GC PCF 440 to authenticate and authorize 5GNR UE 411 for 5G RAT data services. 5GC AMF 436 generates 5G RAT instructions for 5GNR UE 411 responsive to UE capabilities and the authorization. 5GC AMF 436 transfers quality-of-service metrics, network addressing, and 5G RAT instructions for UE 411 to the 5G RAT RRC in BBU 602 and 5GC SMF 438. 5GC SMF 438 directs 5GC UPF 437 to serve UE 411 per the quality-of-service metrics and network addressing over 5G RAT type-A node 421. The 5G RAT RRC in BBU 602 transfers the quality-of-service metrics, network addressing, and 5G RAT instructions to UE 411.

In response to the 5G RAT instructions, UE 411 measures 5G RAT signal strength for 5G RAT type-B node 424 and wirelessly transfers the 5G RAT signal strength to the 5G RAT RRC in BBU 602 over 5G RAT type-A radio 601. The 5G RAT RRC in BBU 602 determines the amount of mobile RRC connected UEs, frequency offset, and hysteresis for 5G RAT type-B node 424. The 5G RAT RRC in BBU 602 may receive a measurement report indicating the amount of mobile RRC connected UEs for 5G RAT type-B node 424. The 5G RAT RRC in BBU 602 determines an inter-RAT addition threshold for 5G RAT type-B node 424 based on the amount of mobile RRC connected UEs for 5G RAT type-B node 424. 5G RAT type-A node 421 determines an inter-RAT addition value for 5G RAT type-B node 424 based on the 5G RAT signal strength, the frequency offset, and the hysteresis.

The 5G RAT RRC in BBU 602 determines when the inter-RAT addition value for 5G RAT type-B node 424 is greater than the inter-RAT addition threshold for 5G RAT type-B node 424. When the inter-RAT addition value is greater than the inter-RAT addition threshold, the 5G RAT RRC in BBU 602 directs 5G RAT type-B node 424 to serve UE 411 and directs UE 411 to attach to 5G RAT type-B node 424. 5G RAT type-A node 421 notifies 5GC AMF 436. 5GC AMF 436 directs 5GC SMF 438 to direct 5GC UPF 437 to serve UE 411 per the quality-of-service metrics and network addressing over 5G RAT type-B node 424. 5GNR UE 411 attaches to 5G RAT type-B node 424 and 5G RAT type-B node 424 exchanges user data with UE 411.

The 5G RAT RRC in BBU 602 determines an inter-RAT drop threshold for 5G RAT type-B node 424 based on the amount of mobile RRC connected UEs for 5G RAT type-B node 424. The 5G RAT RRC in BBU 602 receives subsequent 5G RAT signal strength measurements from UE 411. The 5G RAT RRC in BBU 602 determines an inter-RAT drop value for 5G RAT type-B node 424 based on the subsequent 5G RAT signal strength, the frequency offset, and the hysteresis. When the drop value is lower than the drop threshold, the 5G RAT RRC in BBU 602 signals UE 411 to detach from 5G RAT type-B node 424 and 5G RAT type-B node 424 stops exchanging the user data with UE 411.

Figure 7:
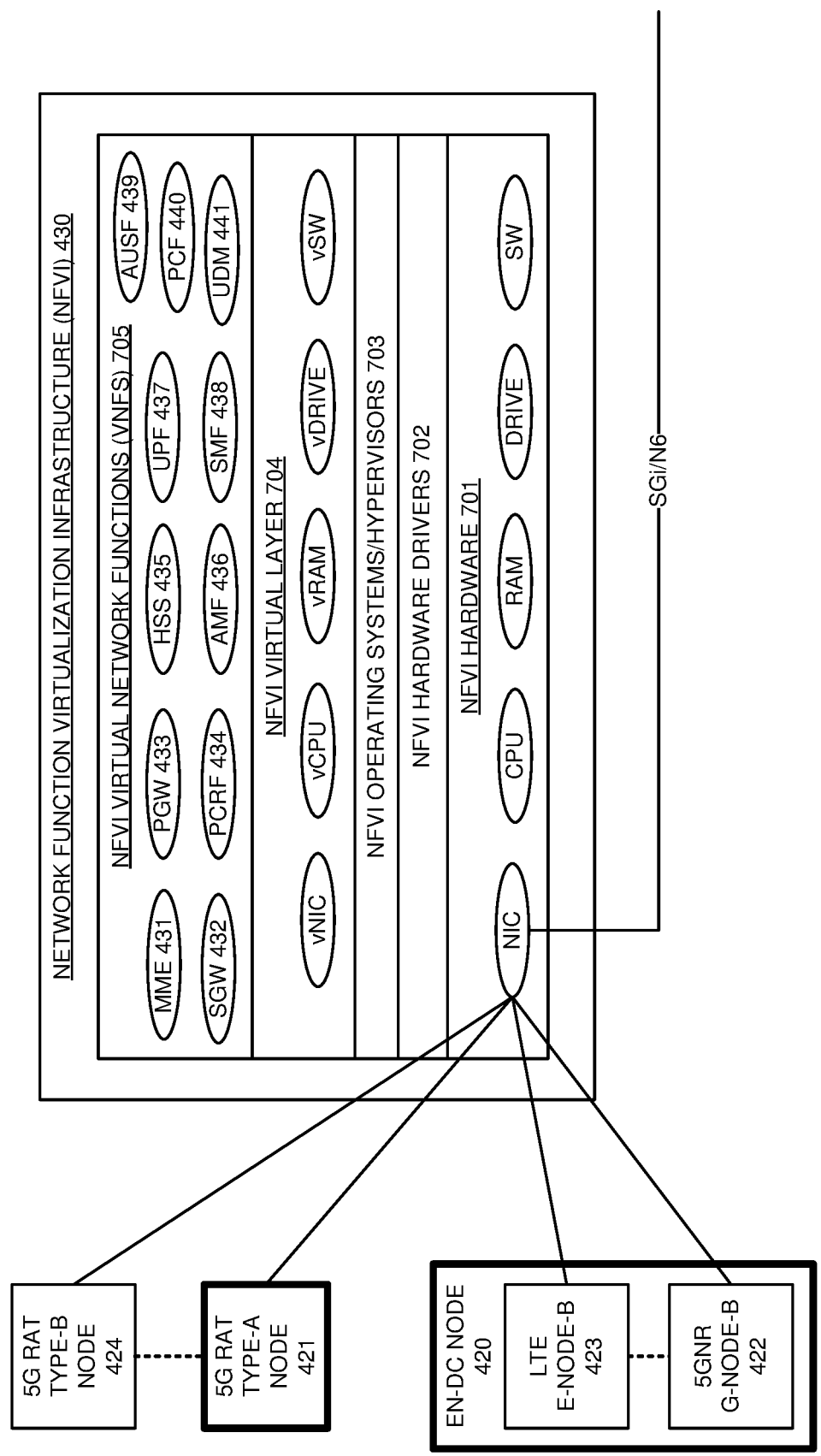
FIG. 7 illustrates a Network Function Virtualization Infrastructure (NFVI) to serve UEs over 5GNR gNodeB and 5G RAT based on the amount of mobile RRC connected wireless UEs.

FIG. 7 illustrates Network Function Virtualization Infrastructure (NFVI) 430 to serve UEs 410-411 over 5GNR and 5G RAT based on an amount of mobile RRC connected UEs. NFVI 430 is an example of network elements 150, although network elements 150 may differ. NFVI 430 comprises NFVI hardware 701, NFVI hardware drivers 702, NFVI operating systems and hypervisors 703, NFVI virtual layer 704, and NFVI Virtual Network Functions (VNFs) 705. NFVI hardware 701 comprises Network Interface Cards (NIC), CPU, RAM, flash/disk drives, and data switches (SWS). NFVI virtual layer 704 comprises virtual NICs (vNIC), virtual CPUs (vCPU), virtual RAM (vRAM), virtual Drives (vDRIVE), and virtual Switches (vSW). The NIC are coupled to NodeBs 422 and 423 and 5G RAT types 421 and 424 over backhaul links. The NIC are coupled to external systems over SGi and N6 links. NFVI VNFs 705 comprise MME 431, SGW 432, PGW 433, PCRF 434, HSS 435, AMF 436, UPF 437, SMF 438, AUSF 439, PCF 440, and UDM 441. Other LTE and 5GC VNFs are typically present but are omitted for clarity. NFVI hardware 701 executes NFVI hardware drivers 702, NFVI operating systems and hypervisors 703, NFVI virtual layer 704, and NFVI VNFs 705 to serve UEs with the data service over NodeBs 422 and 423 and 5G RAT types 421 and 424 based on the amounts of mobile RRC connected UEs for the NodeBs and 5G RAT types.

MME 431 receives S1-MME signaling from LTE eNodeB 423 that requests data services for UE 410 and indicates its 5GNR UE capabilities. MME 431 interacts with HSS 435 to authenticate and authorize UE 410 for wireless data services that are represented by APNs. MME 431 generates 5GNR instructions for UE 410 responsive to the 5GNR UE capabilities and the authorization. MME 431 transfers the APNs for UE 410 and UE 412 to PGW 433 over SGW 432. PGW 433 interacts with PCRF 434 to select QCIs and network addresses for UE 410 based on the APNs. PGW 433 transfers the APNs, QCIs, and addresses to MME 431 over SGW 432. MME 431 transfers the APNs, QCIs, network addresses, and 5GNR instructions for UE 410 to LTE eNodeB 423. MME 431 receives S1-MME signaling from LTE eNodeB 423 for UE 410. PGW 433 exchanges user data for UE 410 with external systems. LTE PGW 433 exchanges the user data with SGW 432 which exchanges the user data with LTE eNodeB 423 and 5GNR gNodeB 422. In some examples, SGW 432 and PGW 433 are integrated together into a System Architecture Evolution Gateway (SAE GW) in NFVI 430.

AMF 436 receives N2 signaling from 5G RAT type-A node 421 that requests data service for UE 411 and indicates its 5G RAT UE capabilities. AMF 436 interacts with SMF 438, AUSF 439, PCF 440, and UDM 441 to authenticate and authorize 5GNR UE 411 for 5G RAT data services. AMF 436 generates 5G RAT instructions responsive to the 5G RAT UE capabilities and the authorization. AMF 436 transfers quality-of-service metrics, network addressing, and the 5G RAT instructions for 5GNR UE 411 to 5G RAT type-A node 421. SMF 438 directs UPF 437 to serve UE 411 over 5G RAT type-A node 421 per the quality-of-service metrics and network addressing. AMF 437 receives N2 signaling from 5G RAT type-A node 421 indicating 5G RAT attachment per the 5G RAT instructions. AMF 436 directs SMF 438 drive UPF 437 to serve UE 411 over 5G RAT type-B node 424 per the quality-of-service metrics and network addressing.

Figure 8:
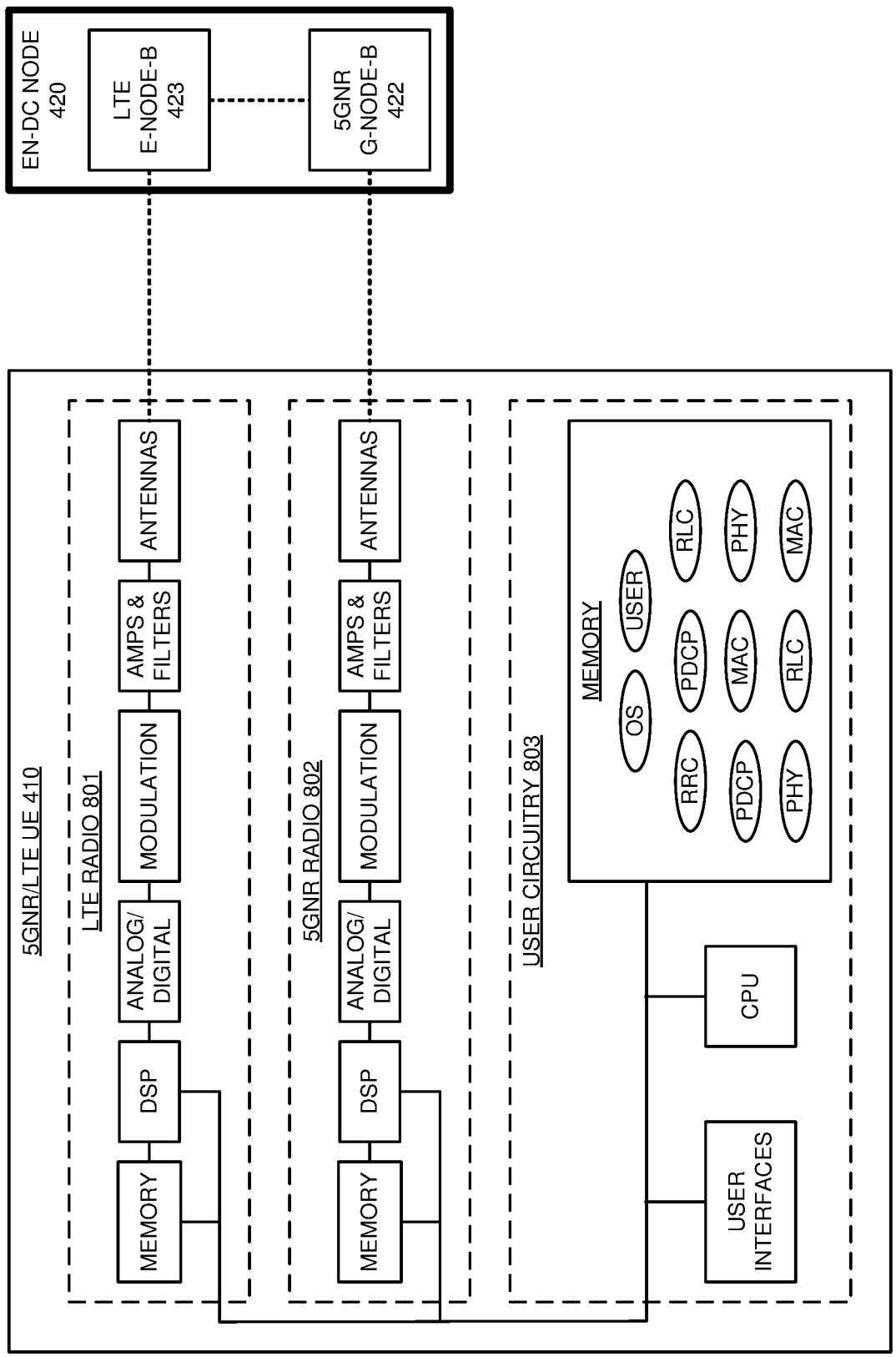
FIG. 8 illustrates a 5GNR/LTE UE that is served by an EN-DC access node based on the amount of mobile RRC connected wireless UEs.

FIG. 8 illustrates 5GNR/LTE UE 410 that is served by EN-DC access node 420 over 5GNR based on an amount of mobile RRC connected UEs. 5GNR/LTE UE 410 is an example of UE 101, although UE 101 may differ. UE 410 comprises LTE radio 801, 5GNR radio 802, and user circuitry 803 that are coupled over bus circuitry. Radios 801-802 comprise antennas, amplifiers, filters, modulation, analog-to-digital interfaces, DSP, and memory that are coupled over bus circuitry. User circuitry 803 comprises user interfaces, CPU, and memory that are coupled over bus circuitry.

The antennas in radios 801-802 are wirelessly coupled to NodeBs 422-423 on EN-DC node 420. The user interfaces in user circuitry 803 comprise graphic displays, machine controllers, sensors, cameras, transceivers, and/or some other user components. The memory in user circuitry 803 stores an operating system, user applications (USER), and network applications (PHY, MAC, RLC, PDCP, and RRC). The CPU in user circuitry 803 executes the operating system and the user applications to generate and consume user data. The CPU in user circuitry 803 executes the operating system and the network applications to wirelessly exchange corresponding signaling and data with NodeBs 422-423 over radios 801-802.

The LTE RRC in UE 410 wirelessly attaches to LTE eNodeB 423 over antennas in LTE radio 801. The LTE RRC in UE 410 generates UL LTE signaling and UL LTE data. The UL signaling indicates 5GNR capability for UE 410. The LTE network applications in UE 410 process the UL LTE signaling and the UL LTE data to generate corresponding UL LTE symbols that carry the UL LTE signaling, UL LTE data, and 5GNR UE capability. The LTE DSP in LTE radio 801 processes the UL LTE symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless LTE signals that transport the UL LTE signaling (indicating the 5GNR UE capability) and UL LTE data for UE 410 to LTE eNodeB 423.

The LTE antennas in LTE radio 801 receive wireless DL signals having DL LTE signaling and DL LTE data and transfer corresponding DL signals through duplexers to the amplifiers. The amplifiers boost the received DL signals for filters which attenuate unwanted energy. Demodulators down-convert the DL signals from their carrier frequency. The analog/digital interfaces convert the analog DL signals into digital DL signals for the DSP. The DSP recovers DL LTE symbols from the DL digital signals. The CPUs execute the network applications to process the DL LTE symbols and recover the DL LTE signaling and DL LTE data. The DL LTE signaling indicates the 5GNR instructions, APNs, QCIs, and network addresses from LTE eNodeB 423.

In response to the 5GNR instructions, the LTE RRC in UE 410 directs the 5GNR PHYs to measure 5GNR signal strength of the 5GNR signal from 5GNR gNodeB 422. The 5GNR PHYs report the 5GNR signal strength to the LTE RRC. The LTE RRC in UE 410 transfers the 5GNR signal strength to LTE eNodeB 423. LTE eNodeB 423 determines a B1 addition threshold based on the amount of mobile RRC connected UEs for 5GNR gNodeB 422. LTE eNodeB 423 determines an inter-RAT addition value based on the 5GNR signal strength. When the inter-RAT addition value is greater than the B1 addition threshold, LTE eNodeB 423 directs the 5GNR PDCP in UE 410 to attach to 5GNR gNodeB 422. 5GNR gNodeB 422 exchanges user data for UE 410 with the 5GNR PDCP in UE 410.

LTE eNodeB 423 determines a B1 drop threshold for 5GNR gNodeB 422 based on the amount of mobile RRC connected UEs for 5GNR gNodeB 422. The LTE RRC in UE 410 directs the 5GNR PHYs to measure subsequent 5GNR signal strength of the 5GNR signal from 5GNR gNodeB 422. The 5GNR PHYs report the subsequent 5GNR signal strength to the LTE RRC. The LTE RRC in UE 410 wirelessly transfers the subsequent 5GNR signal strength measurement to LTE eNodeB 423. LTE eNodeB 423 determines an inter-RAT drop value for 5GNR gNodeB 422 based on the subsequent 5GNR signal strength. When the inter-RAT drop value is lower than the B1 drop threshold, LTE eNodeB 423 signals the 5GNR PDCP in UE 410 to detach from 5GNR gNodeB 422. The 5GNR PDCP in UE 410 detaches from 5GNR gNodeB 422.

Figure 9:
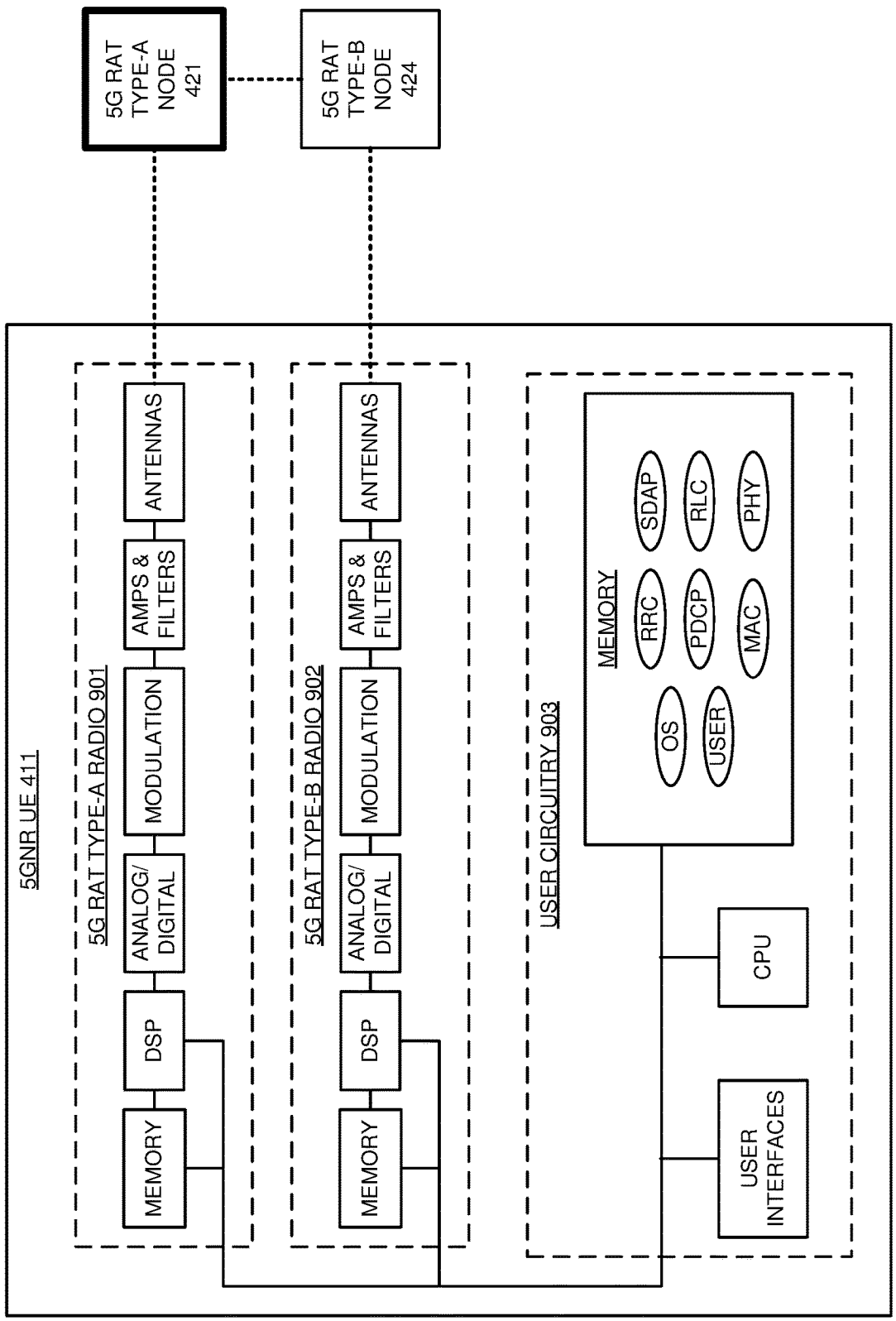
FIG. 9 illustrates a 5GNR UE that is served by a 5G RAT type based on the amount of mobile RRC connected wireless UEs.

FIG. 9 illustrates 5GNR UE 411 that is served by 5G RAT type-A node 421 over 5G RAT based on an amount of mobile RRC connected UEs. 5GNR UE 411 is an example of UE 101, although UE 101 may differ. UE 411 comprises 5G RAT type-A radio 901, 5G RAT type-B radio 902, and user circuitry 903 that are coupled over bus circuitry. 5G RAT radios 901 and 902 comprises antennas, amplifiers, filters, modulation, analog-to-digital interfaces, DSP, and memory that are coupled over bus circuitry. User circuitry 903 comprises user interfaces, CPU, and memory that are coupled over bus circuitry. The antennas in 5G RAT type-A radio 901 are wirelessly coupled to 5G RAT type-A node 421. The antennas in 5G RAT type-B radio 902 are wirelessly coupled to 5G RAT type-B node 424. The user interfaces in user circuitry 903 comprise graphic displays, machine controllers, sensors, cameras, transceivers, and/or some other user components. The memory in user circuitry 903 stores an operating system, user applications, and network applications (PHY, MAC, RLC, PDCP, SDAP, and RRC). The CPU in user circuitry 903 executes the operating system and the user applications to generate and consume user data. The CPU in user circuitry 903 executes the operating system and the network applications to wirelessly exchange corresponding signaling and data with 5G RAT type-A node 421 over 5G RAT type-A radio 901 and 5G RAT type-B node 424 over 5G RAT type-B radio 902.

The 5G RAT RRC in UE 411 wirelessly attaches to 5G RAT type-A node 421 over antennas in 5G RAT type-A radio 901. The 5G RAT RRC generates 5G RAT signals that transport UL 5G RAT signaling and UL 5G RAT data. The 5G RAT signaling indicates 5G RAT capabilities for UE 411—including UE capabilities for different 5G RAT types. The 5G RAT network applications in UE 411 process the UL 5G RAT signaling and the UL 5G RAT data to generate corresponding UL 5G RAT symbols that carry the UL 5G RAT signaling and UL 5G RAT data. The 5G RAT DSP in 5G RAT type-A radio 901 processes the UL 5G RAT symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless 5G RAT signals that transport the UL 5G RAT signaling (indicating 5G RAT type capabilities) and UL 5G RAT data for UE 411 to 5G RAT type-A node 421.

The 5G RAT antennas 5G RAT type-A radio 901 receive wireless DL signals that have DL 5G RAT signaling and DL 5G RAT data and transfer corresponding DL signals through duplexers to the amplifiers. The amplifiers boost the received DL signals for filters which attenuate unwanted energy. Demodulators down-convert the DL signals from their carrier frequency. The analog/digital interfaces convert the analog DL signals into digital DL signals for the DSP. The DSP recovers DL 5G RAT symbols from the DL digital signals. The CPUs in UE 411 execute the network applications to process the DL 5G RAT symbols and recover the DL 5G RAT signaling and the DL 5G RAT data. The DL 5G RAT signaling has 5G RAT instructions, QoS levels, network addresses, and the like.

In response to the 5G RAT instructions, the 5G RAT RRC in UE 411 directs the 5G RAT PHYs in UE 411 to measure 5G RAT signal strength for 5G RAT type-B node 424. The 5G RAT PHYs report the 5G RAT signal strength to the 5G RAT RRC. The 5G RAT RRC wirelessly transfers the 5G RAT signal strength for 5G RAT type-B node 424 to 5G RAT type-A node 421. When the inter-RAT addition value is greater than the inter-RAT addition threshold, 5G RAT type-A node 421 directs the 5G RAT RRC in UE 411 to attach to 5G RAT type-B node 424. The 5G RAT RRC in 5GNR UE 411 attaches to 5G RAT type-B node 424 over 5G RAT type-B radio 902 and 5G RAT type-B node 424 exchanges user data with the 5G RAT SDAP.

The 5G RAT RRC in UE 411 directs the 5G RAT PHYs in UE 411 to measure subsequent 5G RAT signal strength for 5G RAT type-B node 424. The 5G RAT PHYs report the subsequent 5G RAT signal strength to the 5G RAT RRC.

The 5G RAT RRC wirelessly transfers the subsequent 5G RAT signal strength to 5G RAT type-A node 421. When the drop value is lower than the drop threshold, the 5G RAT RRC in 5G RAT type-A node 421 signals the 5G RAT RRC in UE 411 to detach from 5G RAT type-B node 424. 5G RAT type-B node 424 to stops exchanging the user data with UE 411.

Figure 10:
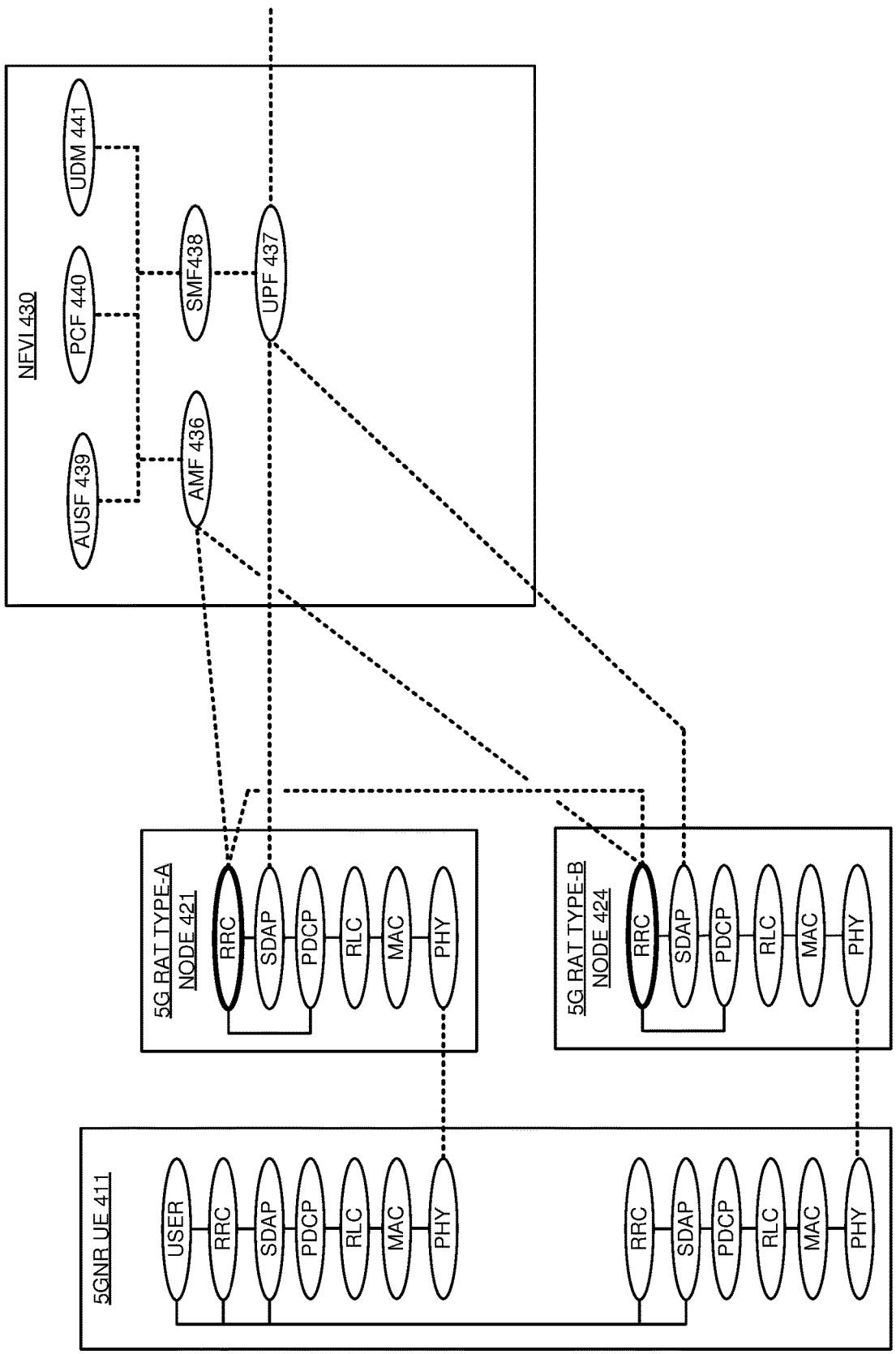
FIG. 10 illustrates an exemplary operation of the UEs, 5G RAT types, and NFVI to serve the UEs over 5G RAT based on the amount of mobile RRC connected wireless UEs.

FIG. 10 illustrates an exemplary operation of UE 411, 5G RAT type-A node 421, 5G RAT type-B node 424, and NFVI 430 to serve UE 411 over 5G RAT based on amount of mobile RRC connected UEs. In 5GNR UE 411, a user application requests data communication, and the 5G RAT RRCs in UE 411 attach to the 5G RAT RRC in 5G RAT type-A node 421 over the 5G RAT PDCPs, RLCs, MACs, and PHYs. The 5G RAT RRC in 5G RAT type-A node 421 sends a request for data services for 5GNR UE 411 in N2 signaling to AMF 436 over the backhaul links.

AMF 436 interacts with SMF 438, AUSF 439, PCF 440, UDM 441, and typically other functions to authenticate and authorize 5GNR UE 411 for 5G RAT data services. SMF 438 directs UPF 437 to serve UE 411 per the quality-of-service metrics and network addressing. AMF 436 generates 5G RAT instructions responsive to the 5G RAT authorization. AMF 436 transfers quality-of-service metrics, network addressing, and 5G RAT instructions for UE 411 to the RRC in 5G RAT type-A node 421 in N2 signaling. The RRC in 5G RAT type-A node 421 transfers the quality-of-service metrics, network addressing, and 5G RAT instructions to the RRCs in UE 411 over the PDCPs, RLCs, MACs, and PHYs.

In response to the 5G RAT instructions, the 5G RAT RRCs in 5GNR UE 411 directs the 5G RAT PHYs in UE 411 to measure 5G RAT signal strength for 5G RAT type-B node 424. The 5G RAT PHYs report the 5G RAT signal strength to the 5G RAT RRCs in UE 411. The 5G RAT RRCs wirelessly transfer the 5G RAT signal strength to the 5G RAT RRC in 5G RAT type-A node 421 over the PDCPs, RLCs, MACs, and PHYs. The 5G RAT RRC in 5G RAT type-A node 421 determines the amount of mobile RRC connected UEs, the frequency offset, and the hysteresis for 5G RAT type-B node 424. The 5G RAT RRC in 5G RAT type-A node 421 determines an inter-RAT addition threshold for 5G RAT type-B node 424 based on the amount of mobile RRC connected UEs for 5G RAT type-B node 424.

The 5G RAT RRC in 5G RAT type-A node 421 determines an inter-RAT addition value for 5G RAT type-B node 424 based on the 5G RAT signal strength, the frequency offset, and the hysteresis. The 5G RAT RRC in 5G RAT type-A node 421 determines when the inter-RAT addition value is greater than the inter-RAT addition threshold for 5G RAT type-B node 424. When the 5G RAT RRC in 5G RAT type-A node 421 determines the inter-RAT addition value is greater than the inter-RAT addition threshold, the 5G RAT RRC in 5G RAT type-A node 421 directs the 5G RAT RRC in 5G RAT type-B node 424 to serve UE 411. The 5G RAT RRC in 5G RAT type-A node 421 directs UE 411 to attach to 5G RAT type-B node 424. The 5G RAT RRCs in UE 411 attach to the 5G RAT RRC in 5G RAT type-B node 424 over the 5G RAT PDCPs, RLCs, MACs, and PHYs. The 5G RAT RRC in 5G RAT type-B node 424 requests 5G RAT service for UE 411 from AMF 436. UPF 437 exchanges user data for UE 411 with external systems. UPF 437 exchanges the user data with the SDAP in 5G RAT type-B node 424. The SDAP in 5G RAT type-B node 424 exchanges the user data with the SDAP in 5GNR UE 411 over the PDCPs, RLCs, MACs, and PHYs. The 5G RAT SDAP in UE 411 exchanges the user data with the user applications.

The 5G RAT RRC in 5G RAT type-A node 421 determines an inter-RAT drop threshold for 5G RAT type-B node 424 based on the amount of mobile RRC connected UEs for 5G RAT type-B node 424. The 5G RAT RRCs in UE 411 direct the 5G RAT PHYs in UE 411 to measure subsequent 5G RAT signal strength of 5G RAT type-B node 424. The 5G RAT PHYs report the subsequent 5G RAT signal strength to the 5G RAT RRCs. The 5G RAT RRCs in UE 411 transfers the subsequent 5G RAT signal strength to the 5G RAT RRC in 5G RAT type-A node 421. The 5G RAT RRC in 5G RAT type-A node 421 determines an inter-RAT drop value for 5G RAT type-B node 424 based on the subsequent 5G RAT signal strength, the frequency offset, and the hysteresis. The 5G RAT RRC in 5G RAT type-A node 421 determines when the inter-RAT drop value is less than the inter-RAT drop threshold. When the inter-RAT drop value is less than the inter-RAT drop threshold, the 5G RAT RRC in 5G RAT type-A node 421 directs the 5G RAT RRC in 5G RAT type-B node 424 to stop serving UE 411 and directs the 5G RAT RRC in UE 411 to detach from the 5G RAT RRC in 5G RAT type-B node 424. The 5G RAT RRC in 5G RAT type-B node 424 and the 5G RAT RRCs in UE 411 stop exchanging the user data over their PDCPs, RLCs, MACs, and PHYs.

Figure 11:
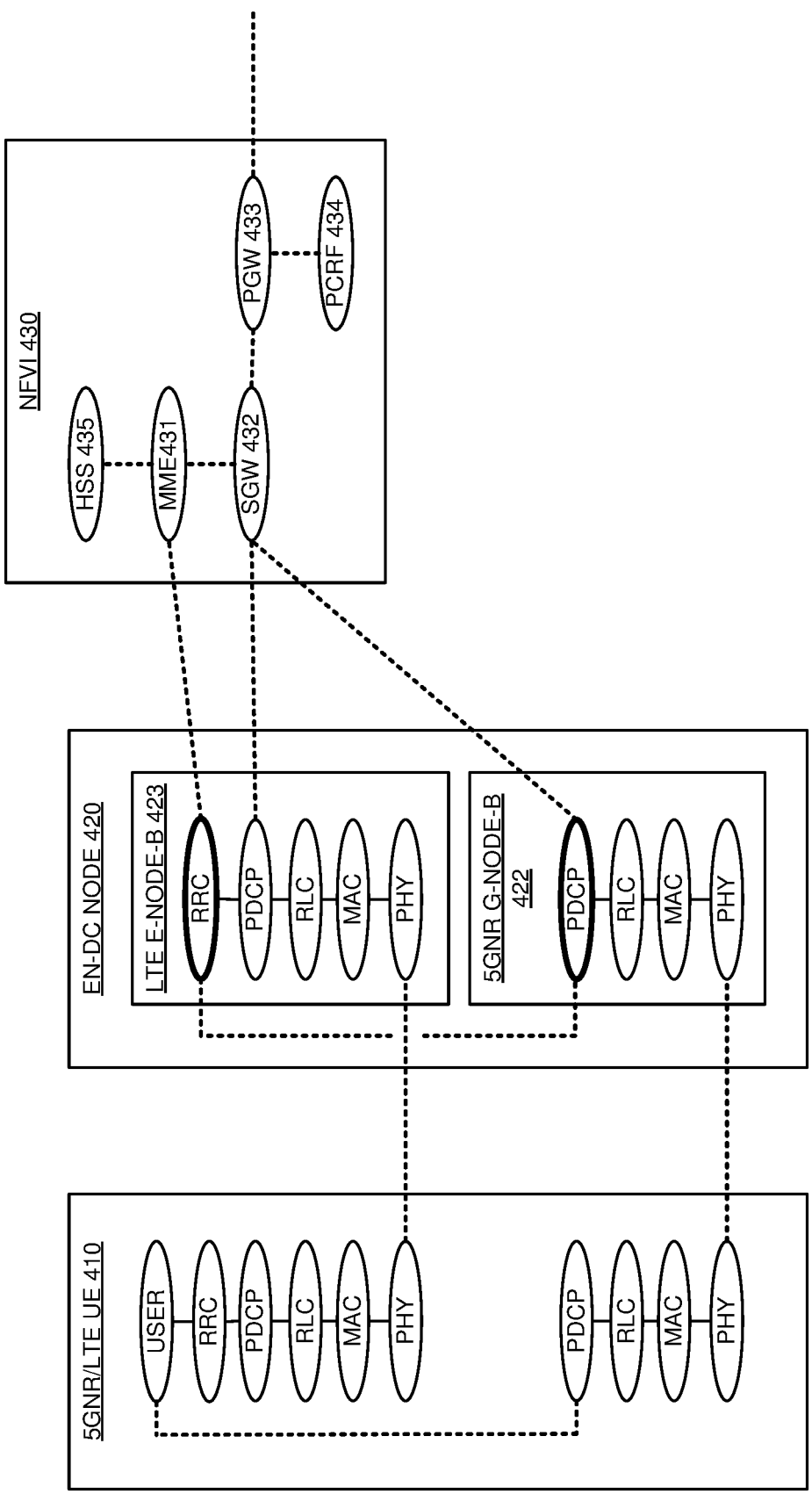
FIG. 11 illustrates an exemplary operation of the UEs, EN-DC access node, and NFVI to serve the 5GNR/LTE UE over 5GNR based on the amount of mobile RRC connected wireless UEs.

FIG. 11 illustrates an exemplary operation of 5GNR/LTE UE 410, EN-DC access node 420, and NFVI 430 to serve 5GNR/LTE UE 410 over 5GNR based on amount of mobile RRC connected UEs. In 5GNR/LTE UE 410, a user application requests data communication, and the LTE RRC in UE 410 attaches to the LTE RRC in LTE eNodeB 423 over the LTE PDCPs, RLCs, MACs, and PHYs. The LTE RRC in UE 410 indicates 5GNR capability for UE 410 to the LTE RRC in LTE eNodeB 423. The LTE RRC in LTE eNodeB 423 transfers S1-MME signaling to MME 431 that requests data services and indicates the 5GNR capability for LTE UE 410.

MME 431 interacts with HSS 435 to authenticate and authorize UE 410 for wireless data services by APNs. MME 431 generates 5GNR instructions for UE 410 in response to the 5GNR authorization and the 5GNR capability. MME 431 transfers the APNs for UE 410 to PGW 433 over SGW 432. PGW 433 interacts with PCRF 434 to select QCIs and network addresses for UE 410 based on the APNs. PGW 433 transfers the APNs, QCIs, and addresses to MME 431 over SGW 432. MME 431 transfers the APNs, QCIs, network address, and 5GNR instructions for UE 410 to the RRC in LTE eNodeB 423. The RRC in LTE eNodeB 423 transfers the APNs, QCIs, network address, and 5GNR instructions to the LTE RRC in UE 410 over the PDCPs, RLCs, MACs, and PHYs. PGW 433 exchanges the user data with SGW 432 which exchanges the user data with the PDCP in LTE eNodeB 423. The PDCP in LTE eNodeB 423 exchanges the user data with the LTE PDCP in UE 410 over the RLCs, MACs, and PHYs.

In response to the 5GNR instructions, the LTE RRC in UE 410 directs the 5GNR PHYs to measure 5GNR signal strength for 5GNR gNodeB 422. The 5GNR PHYs report the 5GNR signal strength to the LTE RRC in UE 410. The LTE RRC in UE 410 transfers the 5GNR signal strength to the LTE RRC in LTE eNodeB 423. The LTE RRC in LTE eNodeB 423 determines the amount of mobile RRC connected UEs, a frequency offset, and a hysteresis for 5GNR gNodeB 422. The LTE RRC in LTE eNodeB 423 determines a B1 addition threshold for 5GNR gNodeB 422 based on the amount of mobile RRC connected UEs. The LTE RRC in LTE eNodeB 423 determines an inter-RAT addition value for 5GNR gNodeB 422 based on the 5GNR signal strength, the frequency offset, and the hysteresis. The LTE RRC in LTE eNodeB 423 determines when the inter-RAT addition value is greater than the B1 addition threshold.

When the inter-RAT addition value is greater than the B1 addition threshold, the LTE RRC in LTE eNodeB 423 directs the 5GNR PDCP in 5GNR gNodeB 422 to serve UE 410. The LTE RRC in eNodeB 423 directs the 5GNR PDCP in UE 410 to attach to the 5GNR PDCP in 5GNR gNodeB 422 over the 5GNR RLCs, MACs, and PHYs. The 5GNR PDCP attaches to the 5GNR PDCP in 5GNR gNodeB 422 over the 5GNR RLCs, MACs, and PHYs. The 5GNR PDCP in 5GNR gNodeB 422 requests 5GNR service for UE 410 from the LTE RRC in LTE eNodeB 423 over X2 signaling. The LTE RRC in LTE eNodeB 423 requests the 5GNR service for UE 410 from MME 431 over S1-MME signaling. MME 431 directs SGW 432 to serve UE 410 over 5GNR gNodeB 422. MME 431 transfers the APNs, QCIs, and network address for UE 410 to the RRC in LTE eNodeB 423. The RRC in LTE eNodeB 423 transfers the APNs, QCIs, and network address to the 5GNR PDCP in 5GNR gNodeB 422 over X2 signaling. The 5GNR PDCP in 5GNR gNodeB 422 transfers the APNs, QCIs, and network address to the 5GNR PDCP in UE 410 over the RLCs, MACs, and PHYs. SGW 432 exchanges user data for UE 410 with external systems. SGW 432 exchanges the user data with the PDCP in 5GNR gNodeB 422. The 5GNR PDCP in 5GNR gNodeB 422 exchanges the user data with the 5GNR PDCP in UE 410 over the RLCs, MACs, and PHYs.

The RRC in LTE eNodeB 423 determines a B1 drop threshold for 5GNR gNodeB 422 based on the amount of mobile RRC connected UEs for 5GNR gNodeB 422. The LTE RRC in UE 410 directs the 5GNR PHYs to measure subsequent 5GNR signal strength. The 5GNR PHYs report the 5GNR signal strength to the LTE RRC in UE 410. The LTE RRC in UE 410 transfers subsequent 5GNR signal strength to the LTE RRC in LTE eNodeB 423 over their PDCPs, RLCs, MACs, and PHYs. The LTE RRC in LTE eNodeB 423 determines an inter-RAT drop value for 5GNR gNodeB 422 based on the subsequent 5GNR signal metrics, the frequency offset, and the hysteresis. The LTE RRC in LTE eNodeB 423 determines when the inter-RAT drop value is less than the B1 drop threshold. When the inter-RAT drop value is less than the B1 drop threshold, the LTE RRC in LTE eNodeB 423 directs the 5GNR PDCP in 5GNR gNodeB 422 to stop serving UE 410 and notifies MME 431. The LTE RRC in LTE eNodeB 423 directs the 5GNR PDCP in UE 410 to detach. UE 410 detaches from 5GNR gNodeB 422. MME 431 directs SGW 432 to stop serving UE 410 over 5GNR gNodeB 422. SGW 432 stops exchanging 5GNR data with the 5GNR PDCP in 5GNR gNodeB 422. The 5GNR PDCP in 5GNR gNodeB 422 stops exchanging the 5GNR data with the 5GNR PDCP in UE 410 over the RLCs, MACs, and PHYs.

The wireless data network circuitry described above comprises computer hardware and software that form special-purpose network circuitry to serve wireless UEs over 5GNR and 5G RAT based on the amount of mobile active UEs wireless access nodes. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve wireless UEs based on the amount of mobile active UEs for 5GNR wireless access nodes.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a wireless User Equipment (UE) with a wireless communication service over multiple wireless communication links, the method comprising:
   a wireless access node wirelessly receiving a signal metric for a support access node from the wireless UE;
   the wireless access node determining an amount of mobile active wireless UEs for the support access node;
   the wireless access node determining an add threshold for the support access node based on the amount of mobile active wireless UEs for the support access node;
   the wireless access node converting the signal metric into an add value for the support access node and determining when the add value is greater than the add threshold;
   when the add value is greater than the add threshold, the wireless access node signaling the support access node to serve the wireless UE and signaling the wireless UE to attach to the support access node;
   the support access node wirelessly transferring user data for the wireless communication service to the wireless UE responsive to the signaling from the wireless access node;
   the wireless access node determining a drop threshold for the support access node based on the amount of mobile active wireless UEs for the support access node;
   the wireless access node receiving a subsequent signal metric for the support access node from the wireless UE;

the wireless access node converting the subsequent signal metric into a drop value for the support access node and determining when the drop value exceeds the drop threshold;

when the drop value exceeds the drop threshold, the wireless access node signaling the support access node to stop serving the wireless UE and signaling the wireless UE to detach to the support access node; and the support access node stopping the wireless transfer of the user data for the wireless communication service to the wireless UE responsive to the subsequent signaling from the wireless access node.

2. The method of claim 1 further comprising the wireless access node receiving a measurement report that indicates the amount of mobile active wireless UEs for the support access node.

3. The method of claim 1 wherein:

the wireless access node determining the amount of mobile active wireless UEs, determining the add threshold, determining the add value, determining when the add value is greater than the add threshold, signaling the support access node, and signaling the wireless UE comprises an LTE access node determining the amount of mobile active wireless UEs, determining the add threshold, determining the add value, determining when the add value is greater than the add threshold, signaling the support access node, and signaling the wireless UE; and the support access node wirelessly transferring the user data comprises a Fifth Generation New Radio (5GNR) access node wirelessly transferring 5GNR data.

4. The method of claim 3 wherein the LTE access node determining the amount of mobile active wireless UEs, determining the add threshold, determining the add value, determining when the add value is greater than the add threshold, signaling the 5GNR access node, and signaling the wireless UE comprises the LTE access node executing a RRC and the RRC determining the amount of mobile active wireless UEs, determining the add threshold, determining the add value, determining when the add value is greater than the add threshold, signaling the 5GNR access node, and signaling the wireless UE.

5. The method of claim 3 wherein the LTE access node determining the amount of mobile active wireless UEs comprises the LTE access node determining a wireless signal angle of arrival for the 5GNR access node.

6. The method of claim 3 wherein the LTE access node determining the amount of mobile active wireless UEs comprises the wireless access node determining a wireless signal time of arrival for the 5GNR access node.

7. The method of claim 3 wherein the amount of mobile active wireless UEs comprises an amount of mobile Radio Resource Control (RRC) connected wireless UEs.

8. The method of claim 3 wherein the add threshold comprises an Evolved Universal Terrestrial Radio Access Network Dual Connectivity (EN-DC) B1 threshold.

9. The method of claim 1 wherein:

the wireless access node comprises a first type of Fifth Generation Radio Access Technology (5G RAT) access node; and the support access node comprises a second type of 5G RAT access node.

10. A wireless communication network to serve a wireless User Equipment (UE) with a wireless communication service over multiple wireless communication links, the wireless communication network comprising:

a wireless access node configured to wirelessly receive a signal metric for a support access node from the wireless UE;

the wireless access node configured to determine an amount of mobile active wireless UEs for the support access node;

the wireless access node configured to determine an add threshold for the support access node based on the amount of mobile active wireless UEs for the support access node;

the wireless access node configured to convert the signal metric into an add value for the support access node and determine when the add value is greater than the add threshold;

when the add value is greater than the add threshold, the wireless access node configured to signal the support access node to serve the wireless UE and signal the wireless UE to attach to the support access node;

the support access node configured to wirelessly transfer user data for the wireless communication service to the wireless UE responsive to the signal from the wireless access node;

the wireless access node configured to determine a drop threshold for the support access node based on the amount of mobile active wireless UEs for the support access node;

the wireless access node configured to receive a subsequent signal metric for the support access node from the wireless UE;

the wireless access node configured to convert the subsequent signal metric into a drop value for the support access node and determine when the drop value exceeds the drop threshold;

when the drop value exceeds the drop threshold, the wireless access node configured to signal the support access node to stop serving the wireless UE and signal the wireless UE to detach to the support access node; and the support access node configured to stop the wireless transfer of the user data to the wireless UE responsive to the subsequent signal from the wireless access node.

11. The wireless communication network of claim 10 further comprising the wireless access node configured to receive a measurement report indicating the amount of mobile active wireless UEs for the support access node.

12. The wireless communication network of claim 10 wherein:

the wireless access node configured to determine the amount of mobile active wireless UEs, determine the add threshold, determine the add value, determine when the add value is greater than the add threshold, signal the support access node, and signal the wireless UE comprises an LTE access node configured to determine the amount of mobile active wireless UEs, determine the add threshold, determine the add value, determine when the add value is greater than the add threshold, signal the support access node, and signal the wireless UE; and the support access node configured to wirelessly transfer the user data comprises a Fifth Generation New Radio (5GNR) access node configured to wirelessly transfer 5GNR data.

13. The wireless communication network of claim 12 wherein the LTE access node configured to determine the amount of mobile active wireless UEs, determine the add threshold, determine the add value, determine when the add value is greater than the add threshold, signal the 5GNR access node, and signal the wireless UE comprises the LTE access node configured to execute a RRC and the RRC configured to determine the amount of mobile active wireless UEs, determine the add threshold, determine the add value, determine when the add value is greater than the add threshold, signal the 5GNR access node, and signal the wireless UE.

14. The wireless communication network of claim 12 wherein the LTE access node configured to determine the amount of mobile active wireless UEs comprises the LTE access node configured to determine a wireless signal angle of arrival for the 5GNR access node.

15. The wireless communication network of claim 12 wherein the LTE access node configured to determine the amount of mobile active wireless UEs comprises the LTE access node configured to determine a wireless signal time of arrival for the 5GNR access node.

16. The wireless communication network of claim 12 wherein the amount of mobile active wireless UEs comprises an amount of mobile Radio Resource Control (RRC) connected wireless UEs.

17. The wireless communication network of claim 12 wherein the add threshold comprises an Evolved Universal Terrestrial Radio Access Network Dual Connectivity (EN-DC) B1 threshold.

18. The wireless communication network of claim 10 wherein:
   the wireless access node comprises a first type of Fifth Generation Radio Access Technology (5G RAT) access node; and
   the support access node comprises a second type of 5G RAT access node.

* * * * *